(12) United States Patent
Vasic et al.

(10) Patent No.: US 7,885,413 B2
(45) Date of Patent: Feb. 8, 2011

(54) HIDDEN LINK DYNAMIC KEY MANAGER FOR USE IN COMPUTER SYSTEMS WITH DATABASE STRUCTURE FOR STORAGE OF ENCRYPTED DATA AND METHOD FOR STORAGE AND RETRIEVAL OF ENCRYPTED DATA

(75) Inventors: Ognjen Vasic, Lenexa, KS (US); Suhail Ansari, Lenexa, KS (US); Ping Gan, Lawrence, KS (US); Jinhui Hu, Lenexa, KS (US); Bassam Khulusi, Overland Park, KS (US); Adam A. Madoukh, Irving, TX (US); Alexander Tyshlek, Lenexa, KS (US)

(73) Assignee: Eruces, Inc., Lenexa, KS (US)

( * ) Notice: Subject to any disclaimer, the term of this patent is extended or adjusted under 35 U.S.C. 154(b) by 435 days.

(21) Appl. No.: 11/931,116

(22) Filed: Oct. 31, 2007

(65) Prior Publication Data

US 2008/0301445 A1    Dec. 4, 2008

Related U.S. Application Data

(63) Continuation of application No. 10/146,782, filed on May 15, 2002, now abandoned, which is a continuation-in-part of application No. 09/693,605, filed on Oct. 20, 2000, now Pat. No. 7,362,868.

(51) Int. Cl.
  *H04L 9/08* (2006.01)
  *G06F 11/30* (2006.01)
(52) U.S. Cl. .................. 380/281; 713/193; 380/282; 380/284; 380/285
(58) Field of Classification Search .................. 713/189, 713/193; 380/277–279, 280, 45, 286, 281–285
See application file for complete search history.

(56) References Cited

U.S. PATENT DOCUMENTS 4,423,287 A    12/1983    Zeidler (Continued)

FOREIGN PATENT DOCUMENTS

| EP | 0884670 | 12/1998 |
|----|---------|---------|
| FR | 2810434 | 12/2001 |
| JP | 11143780 | 5/1999 |

(Continued)

*Primary Examiner*—Christopher A Revak
*Assistant Examiner*—Abdullah Almamun
(74) *Attorney, Agent, or Firm*—Spencer Fane Britt & Browne, LLP

(57) ABSTRACT

A computer system is disclosed that contains cryptographic keys and cryptographic key identifiers. The system has a repository cryptographic engine that communicates securely with a remote cryptographic engine, and the repository cryptographic engine is associated with a user data store. The user data store includes a hidden link including a session key identifier encrypted with a protection key. The hidden link is associated with a remote data entity. A key data store associated with the repository server includes a session key encrypted with a session-key-protection key. The session key is used to encrypt and decrypt the remote data entity. The system also includes a repository key exchange module operable to exchange the session key with a remote key exchange module.

8 Claims, 20 Drawing Sheets

U.S. PATENT DOCUMENTS

| | | | |
|---|---|---|---|
| 4,578,530 A | | 3/1986 | Zeidler |
| 4,713,753 A | | 12/1987 | Boebert |
| 4,912,762 A | | 3/1990 | Lee |
| 5,301,270 A | | 4/1994 | Steinberg |
| 5,363,507 A | | 11/1994 | Nakayama |
| 5,369,702 A | | 11/1994 | Shanton |
| 5,495,533 A | * | 2/1996 | Linehan et al. ............. 713/155 |
| 5,533,123 A | | 7/1996 | Forde |
| 5,546,304 A | | 8/1996 | Marschner |
| 5,625,693 A | | 4/1997 | Rohatgi |
| 5,680,452 A | | 10/1997 | Shanton |
| 5,682,524 A | | 10/1997 | Freund |
| 5,729,608 A | | 3/1998 | Janson |
| 5,757,925 A | | 5/1998 | Faybishenko |
| 5,764,772 A | * | 6/1998 | Kaufman et al. ............. 380/30 |
| 5,778,072 A | | 7/1998 | Samar |
| 5,796,830 A | | 8/1998 | Johnson |
| 5,799,086 A | * | 8/1998 | Sudia ......................... 705/76 |
| 5,809,497 A | | 9/1998 | Freuned |
| 5,815,573 A | | 9/1998 | Johnson |
| 5,881,225 A | | 3/1999 | Worth |
| 5,907,618 A | | 5/1999 | Gennaro |
| 5,915,025 A | | 6/1999 | Taguchi |
| 5,937,066 A | | 8/1999 | Gennaro |
| 5,949,882 A | | 9/1999 | Angelo |
| 6,023,506 A | * | 2/2000 | Ote et al. .................... 713/165 |
| 6,044,154 A | | 3/2000 | Kelly |
| 6,052,469 A | | 4/2000 | Johnson |
| 6,058,188 A | | 5/2000 | Chandersekaran |
| 6,084,969 A | | 7/2000 | Wright |
| 6,226,618 B1 | * | 5/2001 | Downs et al. .................. 705/1 |
| 6,289,451 B1 | | 9/2001 | Dice |
| 6,947,556 B1 | * | 9/2005 | Matyas et al. ................. 380/29 |
| 7,203,314 B1 | * | 4/2007 | Kahn et al. ................. 380/239 |
| 7,362,868 B2 | * | 4/2008 | Madoukh et al. ............ 380/277 |
| 7,747,871 B2 | * | 6/2010 | Kambayashi et al. ....... 713/193 |
| 2002/0031230 A1 | | 3/2002 | Sweet |

FOREIGN PATENT DOCUMENTS

| | | |
|---|---|---|
| WO | WO9749211 | 12/1997 |
| WO | WO0004435 | 1/2000 |
| WO | WO0135226 | 5/2001 |
| WO | WO0229577 | 4/2002 |

OTHER PUBLICATIONS

Churches, Tim; A proposed architecture and method of operation for improving the protection of privacy and confidentiality in disease registers; BMC Medical Research Methodology, Biomed Central, London, GB, vol. 3, No. 1; Jan. 6, 2003, pp. 1-13.

Lotus Notes, The Power of People Working Together, Administrator's Guide, 4.5 Release; Lotus Development, Cambridge, MA; Feb. 26, 2007.

Lotus Notes Administrator's Guide The Power of People Working Together, pp. i-xix; pp. 341-381, pp. 521-551, Lotus Development, Cambridge, MA 02142, 1996.

* cited by examiner

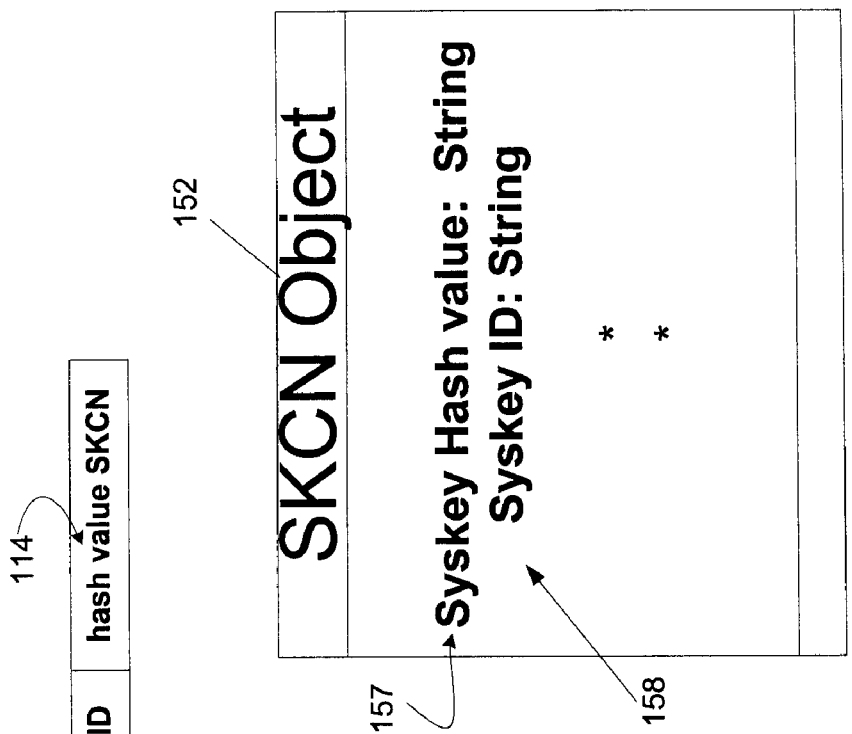
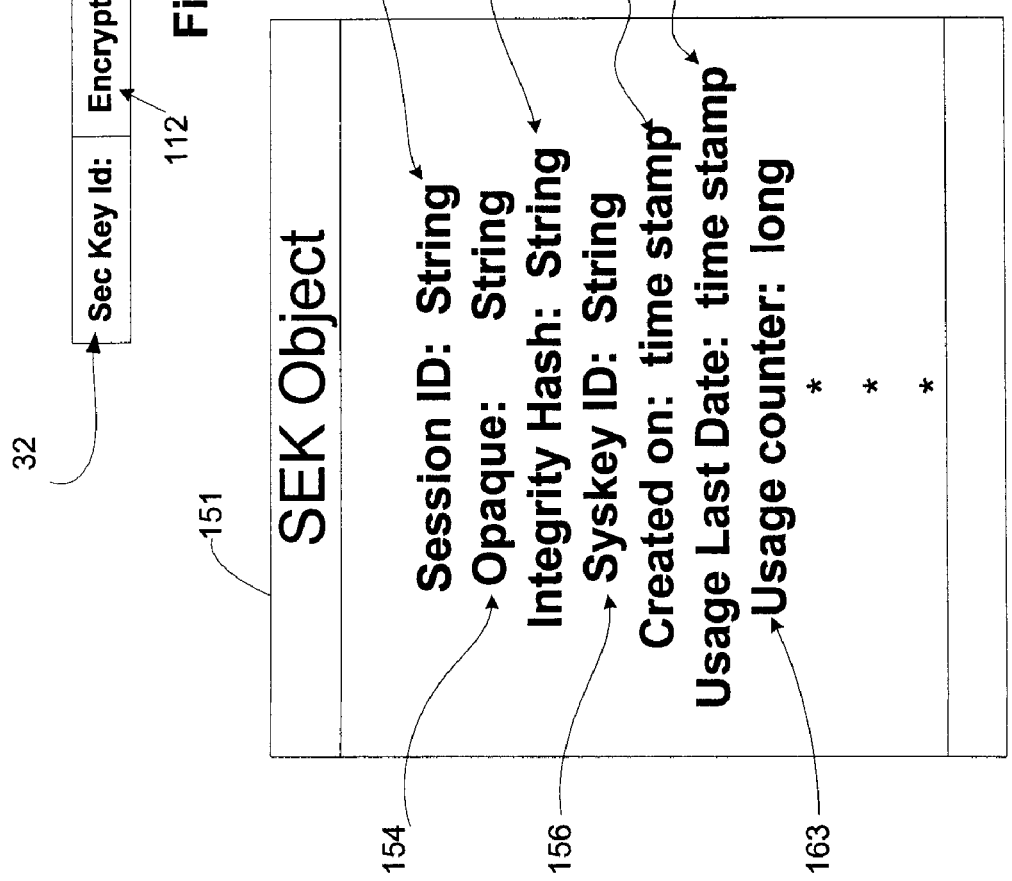
Fig. 4
Fig. 8
Fig. 9

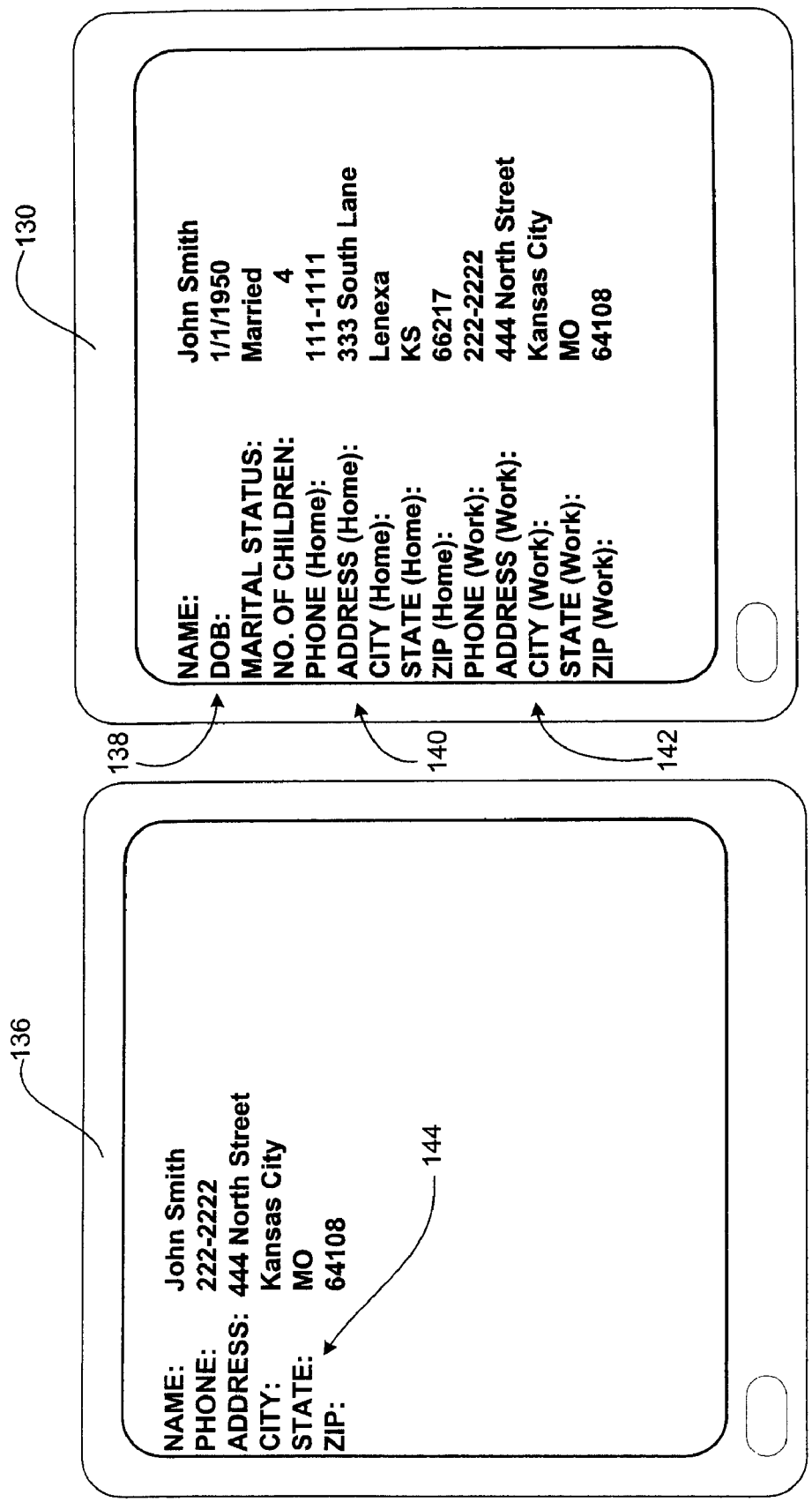

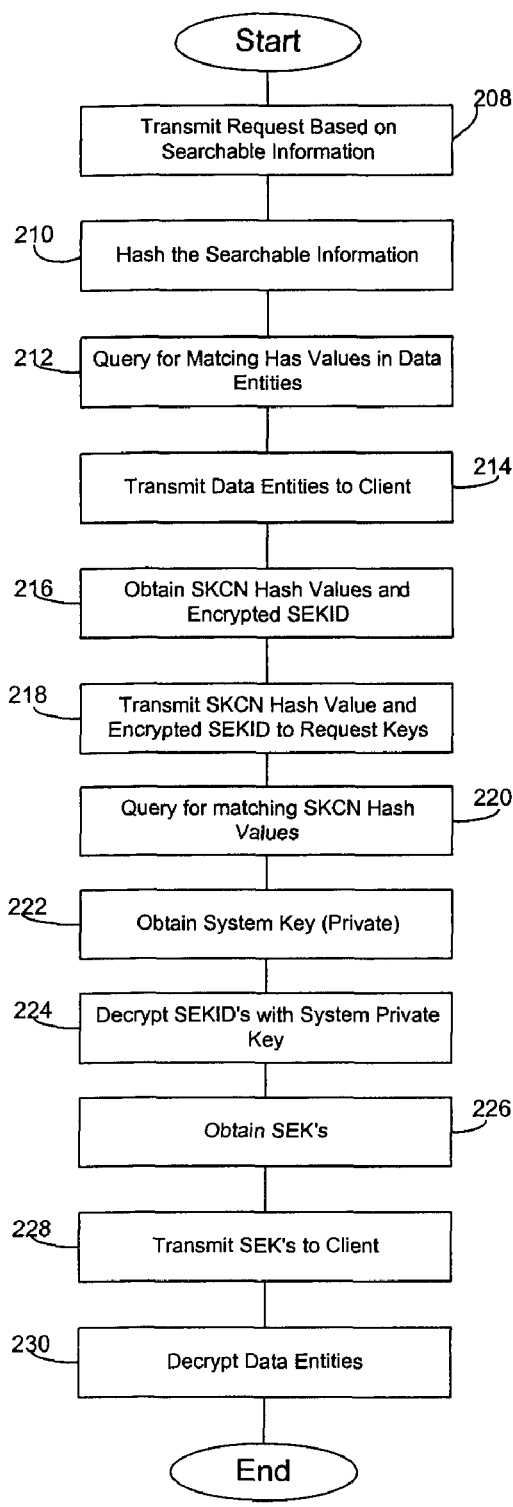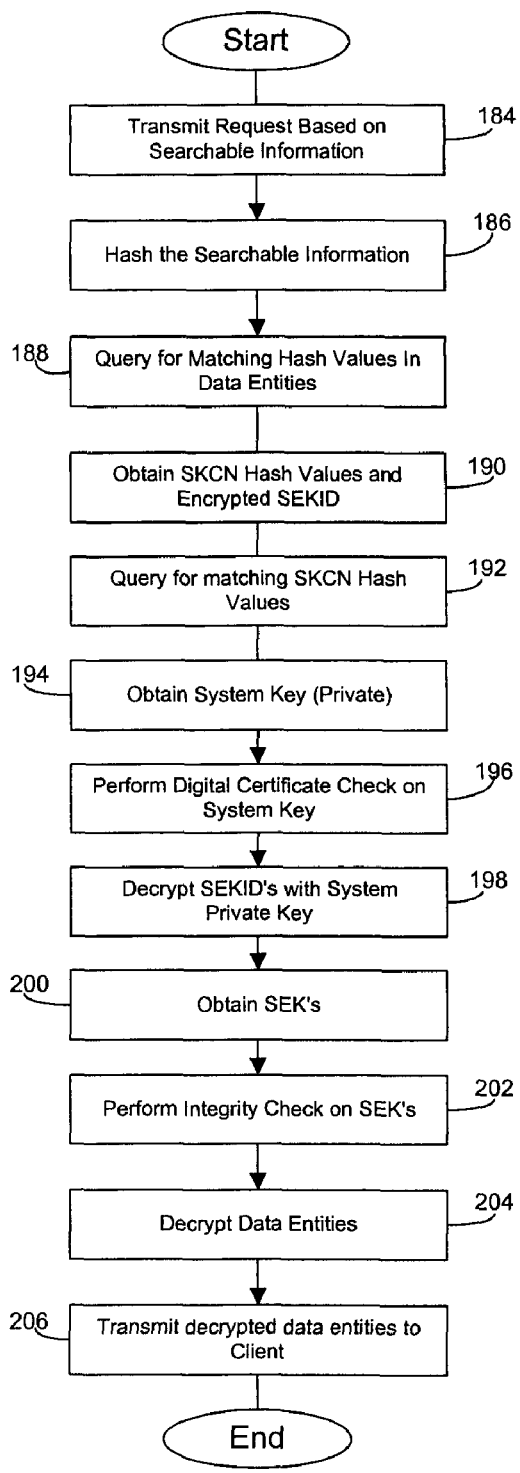
Fig. 12
Fig. 11

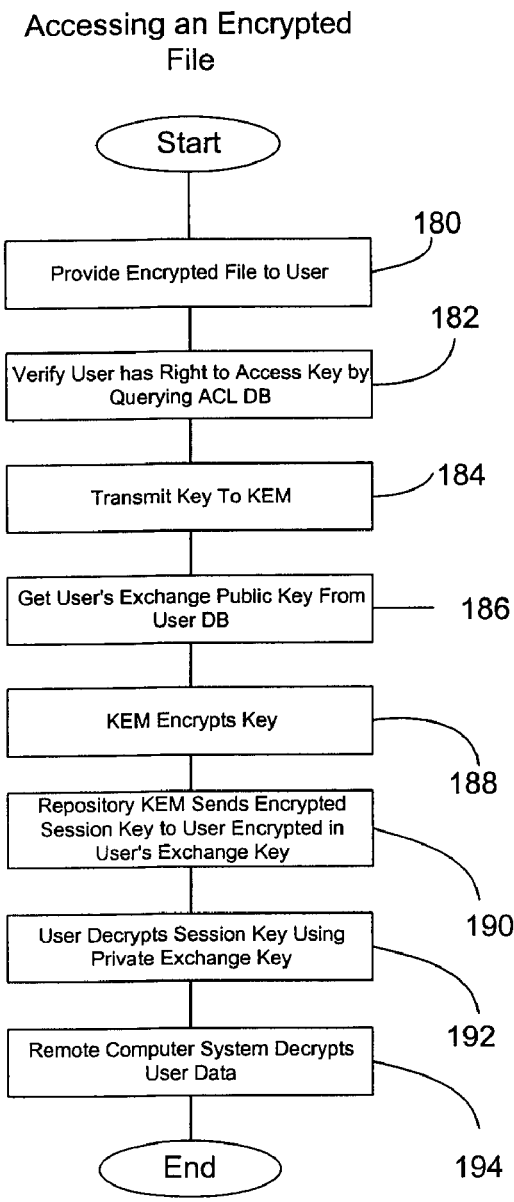
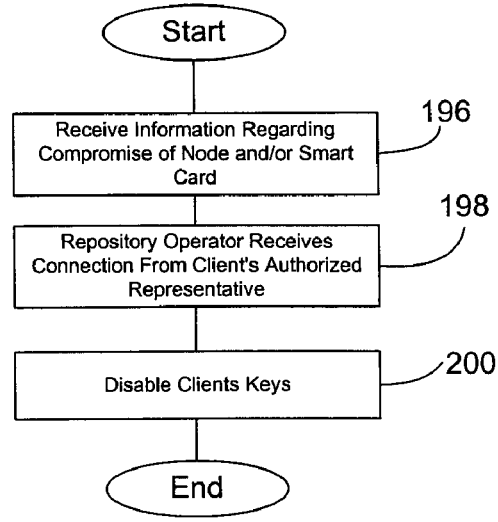
Fig. 23
Fig. 22

Run-time Authentication

HIDDEN LINK DYNAMIC KEY MANAGER FOR USE IN COMPUTER SYSTEMS WITH DATABASE STRUCTURE FOR STORAGE OF ENCRYPTED DATA AND METHOD FOR STORAGE AND RETRIEVAL OF ENCRYPTED DATA

RELATED APPLICATIONS

This is a continuation application and claims priority of U.S. patent application Ser. No. 10/146,782, filed May 15, 2002, now abandoned which is a continuation-in-part of U.S. patent application Ser. No. 09/693,605, filed Oct. 20, 2000, now U.S. Pat. No. 7,362,868. The identified applications are incorporated herein by reference.

BACKGROUND OF INVENTION

For various reasons, organizations frequently need to exchange confidential information over a network. Sometimes organizations establish private networks over dedicated leased lines for this purpose and to avoid use of a public network. A leased line is a dedicated point-to-point connection over the telephone network that is used for, among other things, routing regular telephone calls. For example, leased lines are used to provide private network connections between regional offices and corporate headquarters, carrying only information that is intended to be sent between the regional office and the headquarters.

A leased line may also be used to connect an organization to an Internet Service Provider (ISP). The ISP connects its customer to a public network, such as the Internet. With a connection to a public network, a customer may send and receive messages to any other party also connected to the public network. This has advantages of convenience and low cost relative to dedicated, private leased lines, because only a single connection to the ISP must be maintained. However, a network user has much less control over information sent and received over a public network than a user has over data sent on a private leased line. Specifically, in a public network, operators of networking equipment that routes information between an arbitrary sender and receiver may intercept the information and examine it or even modify it en route. Further, over a public network, senders and receivers have no convenient way to police the behavior of intermediate network providers.

Accordingly, it is conventional wisdom that dedicated leased lines provide better control over the privacy and integrity of information, because while it is possible for a provider of private leased lines to examine or alter information on the private network, users of the private leased lines know who the provider is and can establish reasonable procedures to audit the behavior of the provider to ensure a reasonable level of data privacy and integrity. In a public network like the Internet, it is impracticable to ensure that intermediate network operators will not examine or alter an arbitrary message placed on the public network.

Therefore, in terms of data privacy and data integrity, private networks on leased lines are preferable to conventional public network connections. Nevertheless, it is frequently the case that use of dedicated leased lines for all networking becomes impractical due to the sheer number of necessary dedicated connections and the substantial expense of leased lines. Accordingly, other means of establishing data privacy and integrity have been established.

One of these means is the Virtual Private Network (VPN), which uses cryptography to create a virtual point-to-point connection between nodes, including computers, using a public network, such as an Internet Protocol (IP) network like the Internet. Similar to a private network, a VPN involves a point-to-point connection, however, because it uses encrypted information over a public network to establish the "virtual" connection, a VPN does not require dedicated leased lines.

Hardware and software are widely available to implement VPN's. However, the hardware and software and particularly staff to properly operate the VPN's can be quite expensive.

Because information is encrypted and unencrypted at the network level at both ends of the point-to-point link, if an attacker is successful in compromising an operating system of an end node or computer, the attacker has complete access to all information exchanged in the VPN. Accordingly, the key to ensuring safe, uncompromised operation of a VPN is to make sure that attackers and intruders are not able to compromise or gain unauthorized access to the VPN end nodes.

To prevent unauthorized access, organizations use firewalls and sound system administration techniques. Firewalls filter or restrict the types of packets allowed to pass between external public networks and internal networks. However, firewalls must allow the exchange of at least some packets to and from a public network in order for the connection to the public network to be of any value.

Accordingly, as long as some packets are being exchanged with the public network, there are opportunities for attackers to gain unauthorized access. The next level of defense is to keep operating system level security layers secure. System level security layers include the pieces of software that require user names and passwords to allow connections and the like.

A common technique of attackers to gain unauthorized access is to exploit known defects in operating system security layers. These defects are ordinarily caused by human errors in the design and implementation of the system software. Accordingly, as fixes for the defects become available it is imperative to apply the fixes or patches. Monitoring and timely applying fixes and patches is an important aspect of sound system administration. If patches are not applied, intruders can easily gain access to end nodes.

In addition to a VPN, which requires configuration between endpoints of a point-to-point link, other methods exist for establishing an encrypted channel through which to exchange private information over a public network. These channel protections include protocols like Secure Sockets Layer (SSL) and Secure Shell (SSH).

Cryptography involves using codes and transformations on messages to render the messages unintelligible to anyone other than an intended recipient of the message. In the context of protecting data privacy, the process of rendering a message unintelligible is called encryption, and the process of unscrambling a message by an intended recipient to render the message intelligible is called decryption. Frequently, additional information other than the message itself is used to decrypt an encrypted message. Since encrypting is like locking a message and decrypting like unlocking it for the intended recipient, the information used for encrypting or decrypting is frequently called a key.

In addition to protecting the privacy of information, it is useful to ensure the integrity of information, data integrity meaning that data is authentic and not altered with authorization. One way to ensure the authenticity of information is to calculate a message digest on the information and to digitally sign the message digest. A message digest is frequently the output of a one-way hash function such as MD5 or SHA-1, which irreversibly produce fixed length output digests from messages of an arbitrary length. Upon receipt, a receiver can re-calculate the message digest on the received message and verify the signature. By verifying the signature and comparing the calculated message digest to the signed message digest, the receiver verifies that he or she has received, unaltered, the same message originally signed by the sender.

Other methods of providing verification of data integrity include Keyed-Hashing for Message Authentication (HMAC). HMAC is a mechanism that can authenticate both the source of a message and its integrity. HMACs utilize an arbitrary one-way hash function, such as MD5 or SHA-1 in connection with a shared secret, or key, to provide a message authentication code. HMACs can also be used in connection with challenge response protocols in which a response is computed that is a function of the secret key and the challenge message. Authenticity of information is verified when the receiver performs the HMAC calculation on the received message and compares it to the message authentication code sent in connection with the message. The receiver further can verify that the message originated from a source that was in possession of the secret key. HMAC is further described in RFC 2104.

A key can be a number used in a formula to operate on a message to either encrypt or decrypt the message. Other types of keys include one time pads, which are lists of keys that are applied to messages to encrypt and decrypt them, in which each element of the list of keys is used only once. Of course to keep an encrypted message from being decrypted by someone other than the intended recipient of the message, it is crucial to keep keys out of the hands of non-intended recipients. Therefore keys must be exchanged between parties to encrypted communication in a secure manner. One inconvenient way to do this is by way of a trusted courier that physically delivers keys to parties in a locked briefcase thereby ensuring actual security by way of verifiable physical security. However, physical courier methods of key exchange are generally too cumbersome, slow, and expensive.

Accordingly, one of the major challenges in cryptography is the process of key exchange. A popular method for exchanging keys is to use public key cryptography to exchange a symmetric key. Public key cryptography uses two kinds of keys to encrypt and decrypt information, namely public keys, which are intended to be widely distributed and associated with particular entities, and private keys, which are intended to be kept in a highly confidential and secure manner. Conversely, symmetric cryptography uses the same key to encrypt and to decrypt information.

Public key cryptography works by encrypting a message in a public key. Once encrypted in a public key, a message can only be decrypted using the corresponding private key. Similarly, a signer may create a digital signature by applying his or her private key to a message or typically to a digest of a message, which is a fixed-length piece of information that uniquely identifies the message. A digital signature is verified by applying the purported signer's public key to the signature to determine whether the signature is valid.

A simplified use of public key cryptography to exchange a symmetric key is accomplished in the following way. One party generates a new symmetric key, for example using a random number generator. Next, the party encrypts the symmetric key using the public key of the intended recipient and sends the encrypted message to the intended recipient. The recipient uses his or her private key to decrypt the message, thereby securely receiving the symmetric key which can be used to secure a channel for further communication.

An important concern in any application of public key cryptography is that a user of a public key cryptosystem (e.g. a sender of an encrypted message) uses authentic public keys of other parties. If a sender mistakenly uses the public key of an attacker, the attacker will be able to decrypt the message and will have the symmetric key allowing the attacker access to the secure channel. Further, if the attacker is able to inject himself or herself into the channel in this way, the attacker can forge messages to the recipient and mount a so called "man-in-the-middle" attack, in which both sender and receiver believe they are communicating directly over a secure channel but in reality are communicating through an attacker who has the ability to examine and alter messages as they pass between sender and recipient. Accordingly, the effective use of public key cryptography requires users to be able to verify that a particular public key is the true public key of the person to whom they wish to communicate. Ensuring that a public key is the correct public key is the problem of public key validation.

One way to solve the public key validation problem is to publish the public key in a major newspaper and for users of the public key to manually compare the public key they are using to the published numbers. This system is quite effective and occasionally used in practice. It is, however, somewhat inconvenient and not conveniently subject to automation. Other public key validation procedures have been employed. In a "ring of trust" environment, such as that used in the Pretty Good Privacy (PGP)™ system a user may manually input or automatically import public keys coming from a trusted source. Another solution to verification of public keys is the digital certificate, in which a public key is digitally signed, and according to which users of a public key cryptosystem can verify the authenticity of a certificate, and its corresponding public key, by validating a the digital signature on the certificate. The signature is validated using a preestablished, trusted public key of a Certification Authority (CA).

The SSL protocol uses digital certificates. In SSL, a web server has an X.509-formatted digital certificate, which is digitally signed by a trusted CA, using the CA's private key. In an SSL environment, the CA's signature can be verified at the client using a trusted version of the CA's public key. In popular browsers, public keys of popular CA's come preloaded into the browser. SSH requires an initial trusted exchange of a server's public key so that in subsequent transactions, the identity of the server can be verified by the user using conventional public key technology.

Accordingly, VPNs and channel protectors such as SSH and SSL protect data as it is exchanged from a secure node to another secure node over a potentially insecure network. However, these channel protectors protect data in transit only. Channel protection technology cannot protect data once it has been decrypted on a destination node. And firewall and sound system administration technology have proven not to be entirely effective in keeping intruders from gaining unauthorized access to network-connected computer systems. Thus, highly publicized assaults have been successful in quickly stealing thousands of credit card numbers and other confidential information from various web sites, for example.

In some situations, an organization attempts to protect fixed encryption keys and other sensitive data by locating its servers in a physically secure room equipped with locked doors and surveillance cameras. However, remote intruders do not need physical access to server rooms in order to access data stored on a company's server. Intruders merely need some form of remote access to the company's network. Even with the use of firewalls, this access can be gained through known exploits, incorporating techniques including for example, IP spoofing, in which an intruder forges packets to have false IP source addresses. Other techniques include network scanning which helps to identify systems having exploitable defects.

Once an intruder gains access to one system on an internal network, it becomes possible to exploit other weaknesses in the internal network, such as intercepting unencrypted network traffic and using the information gained from the traffic to access to other systems on the internal network. For example, many common E-mail programs transmit username and password messages unencrypted or using easily breakable obfuscation of the actual values.

Once access is gained to key system resources, i.e. root access to a conventional database server, an intruder has essentially full access the organization's information, including, for example, credit card numbers, identifiable medical records, and other sensitive confidential information about the organization's patients, customers, and/or employees. Other examples of confidential information that can be obtained by unauthorized access include credit card numbers, bank account numbers, social security numbers, birth dates, and highly personal and private medical records.

In connection with access to information, including access to keys to encrypt and decrypt information, it is useful to verify identity and authorization of users of the information and of the software the user is employing to access the information. Accordingly, user authentication and software, or code, authentication schemes have been devised to perform the authentication of users and code. User authentication can be performed by, for example, receiving a password and comparing the password to a stored password or by irreversibly converting the received password into another form and comparing the converted password to a stored password in the same form. Similarly, software components can be authenticated by using, for example, a digital signature. Known methods of providing software component authentication using signed components, however, rely on policy files and a PKI chain of trust. Unfortunately, there are also known methods of undermining security that depends on the integrity of an ordinary policy file. Further, in connection with components that are signed with an enterprise-level signing private key, an intruder that obtains access to the enterprise-level signing private key can place signatures on rogue software components. Accordingly, there is a need in the art for methods and systems of software component authentication that do not suffer from the deficiencies of known methods and systems.

From a patient's perspective, the consequences of unauthorized access to personal medical records can be devastating. For a typical consumer, canceling and replacing credit cards is a relative minor inconvenience compared to the compromise and potential publication of sensitive medical information. Further, tampering with medical information is a potentially life threatening violation of privacy and data integrity. Therefore, the protection of confidential information, especially medical records, requires a greater assurance that the customer's or patient's confidential information is secure. Known methods of securing data only while it is being transmission do not meet this need.

SUMMARY OF INVENTION

A computer system is provided that contains cryptographic keys and cryptographic key identifiers. The system has a repository cryptographic engine that communicates securely with a remote cryptographic engine, and the repository cryptographic engine is associated with a user data store. The data store includes a hidden link including a session key identifier encrypted with a protection key. The hidden link is associated with a remote data entity. An associated key data store includes a session key encrypted with a session-key-protection key. The session key is used to encrypt and decrypt the remote data entity. The system also includes a repository key exchange module operable to exchange the session key with a remote key exchange module.

The session key identifier is optionally operable to identify the session key corresponding to the remote data entity. The computer system optionally also includes an authorization module that controls access to operations. The authorization module is optionally further coupled with a user data store and access to the session key is further provided based on the user data store. The protection key is a preferably a symmetric cryptographic key.

In an embodiment, the session-key-protection key is a symmetric cryptographic key. In an alternative embodiment, the session-key-protection key and the protection key are equivalent. The symmetric cryptographic key is optionally the triple Data Encryption Standard or the Advanced Encryption Standard.

A distributed network is provided including a repository server containing cryptographic keys. The network includes a repository cryptographic engine operable to communicate securely with a remote cryptographic engine. The network also includes a remote cryptographic agent operable to communicate securely with the remote cryptographic engine. Further, the network includes a business application coupled with the remote cryptographic agent, wherein authenticity of the business application is verified by the remote cryptographic engine by comparing a stored fingerprint of the business application with a calculated fingerprint of the remote cryptographic agent.

A cryptographic method is provided for facilitating the secure storage of information. First, a key request is received for a session key from a requesting key exchange module at a remote computer system. The key request includes a hidden link. Next, the session key is accessed and encrypted based on the hidden link using a protection key. Then an exchange public key is received corresponding to the requesting key exchange module. The session key is encrypted in the exchange public key, resulting in an encrypted session key. Further, the encrypted session key is transmitted to the requesting key exchange module. Then, at a computer system associated with a requester, the encrypted session key is received with an exchange private key corresponding to the exchange public key. A data entity is encrypted with the session key, and the hidden link is attached to the data entity. Further, the data entity is stored.

BRIEF DESCRIPTION OF DRAWINGS

These and other inventive features and advantages appear from the following Detailed Description when considered in connection with the accompanying drawings in which similar reference characters denote similar elements throughout the several views and wherein:

FIG. 4 is a schematic diagram of a security key identification attribute of the database structure of FIG. 4;

FIG. 5 is a schematic diagram of a monitor illustrating adaptable display parameters according to the present invention and having only public information and fields displayed;

FIG. 6 is a schematic diagram of a monitor illustrating the adaptable display parameters according to the present invention and having both public and private information and fields displayed;

FIG. 8 is a schematic diagram of a session encryption key data entity;

FIG. 9 is a schematic diagram of a system key common name data entity;

FIG. 11 is a schematic block diagram illustrating the retrieval and decryption of data entities during update and view transactions;

FIG. 12 is a schematic block diagram illustrating an alternate embodiment for the retrieval and decryption of data entities during update and view transactions;

FIG. 22 is a schematic block diagram illustrating a process of accessing an encrypted file;

FIG. 23 is a schematic block diagram illustrating a process of blocking access associated with a key in response to the key becoming compromised;

DETAILED DESCRIPTION

Figure 1:
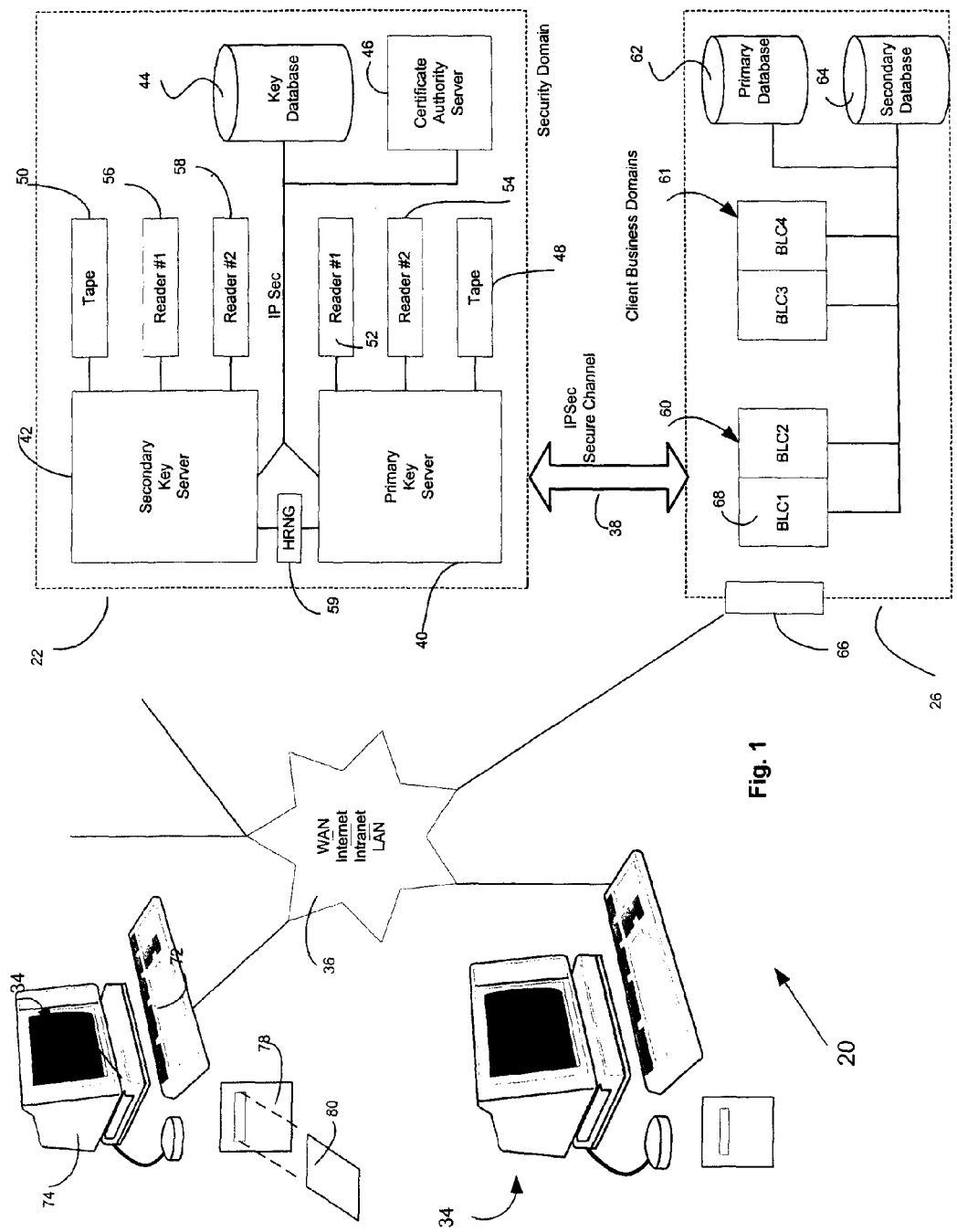
FIG. 1 is a schematic diagram of a computer system implementing a hidden link dynamic key manager according to the present invention.
Figure 2:
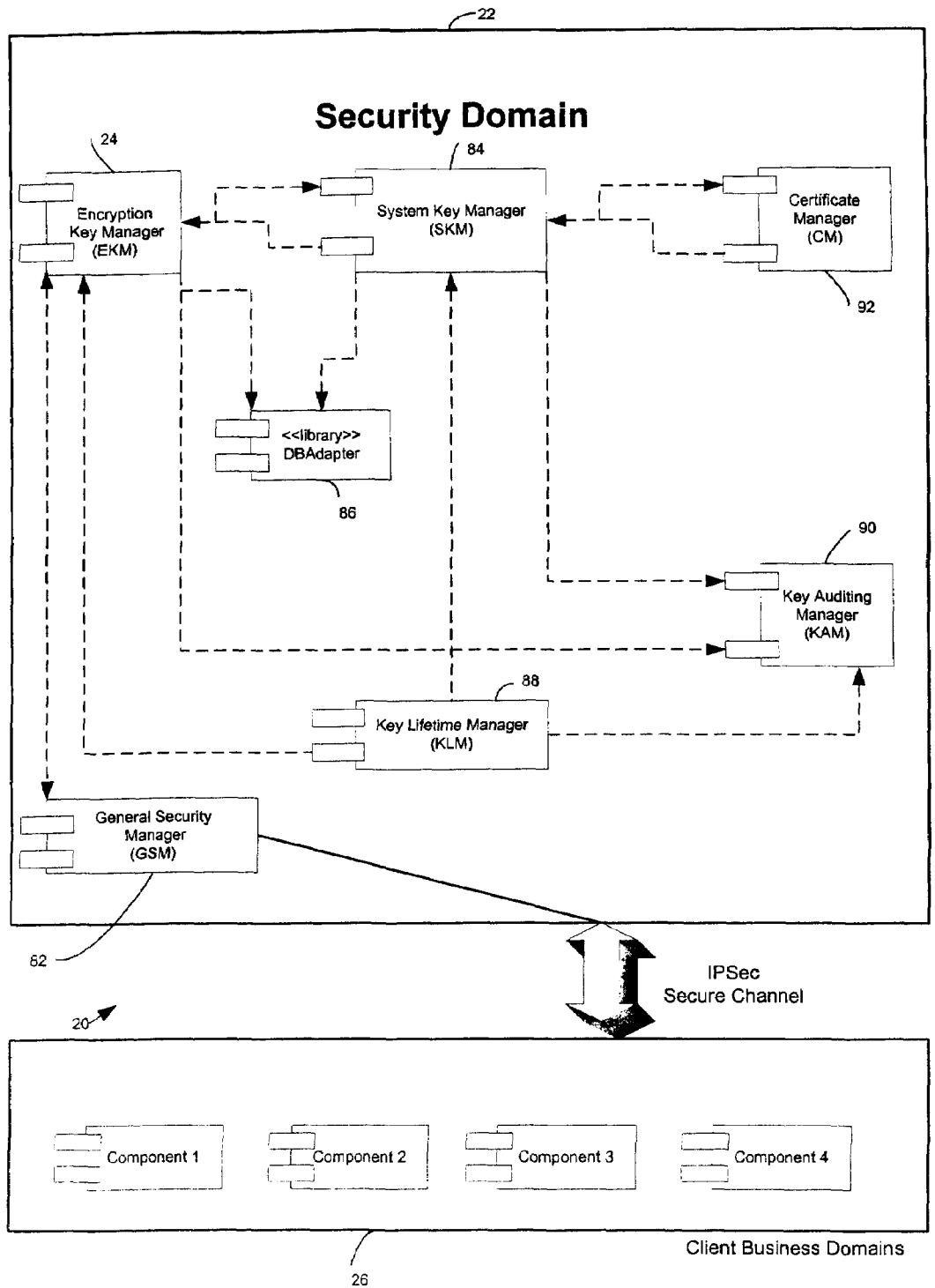
FIG. 2 is a schematic block diagram of the computer system of FIG. 1 illustrating software components of the computer system.

Referring to the drawings in greater detail, FIGS. 1 and 2 show a computer system 20 constructed in accordance with a preferred embodiment of the present invention for storing information. The present invention provides an improved method of encrypting and decrypting data preferably at rest, which is to say in its native form, for example in a file system or in a data base server. The computer system 20 broadly includes a security domain 22 having an encryption key manager (EKM) 24, system key manager (S KM) 84, key lifetime manager (KLM) 88, key auditing manager (KAM) 90 and database adapter (DBAD) 86. In an alternative embodiment, other enterprise security components are included in security domain 22.

Figure 10:
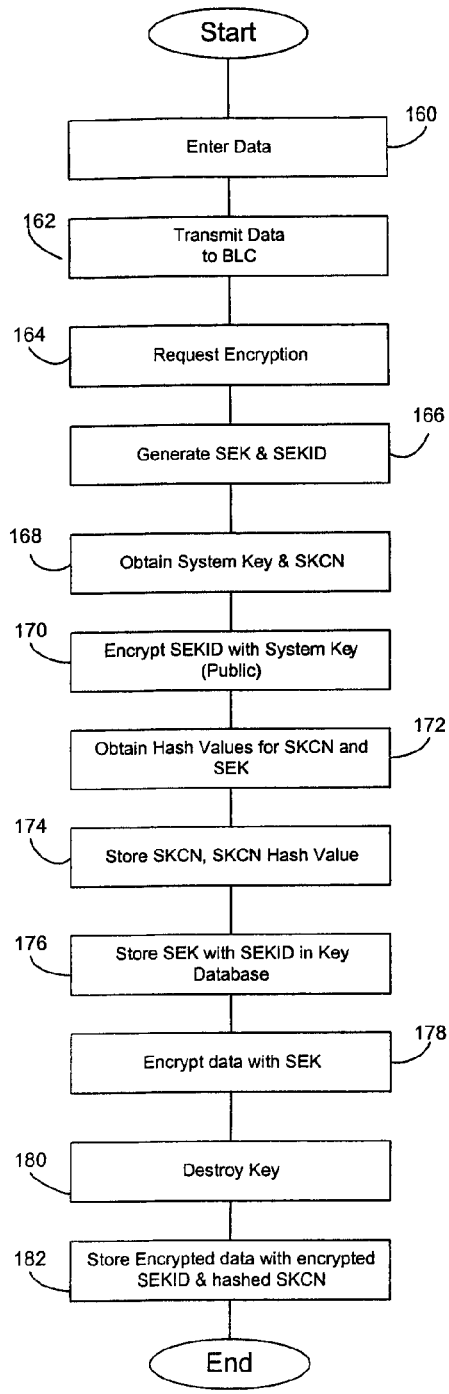
FIG. 10 is a schematic block diagram illustrating the encryption and storage of data entities during an add transaction.
Figure 13:
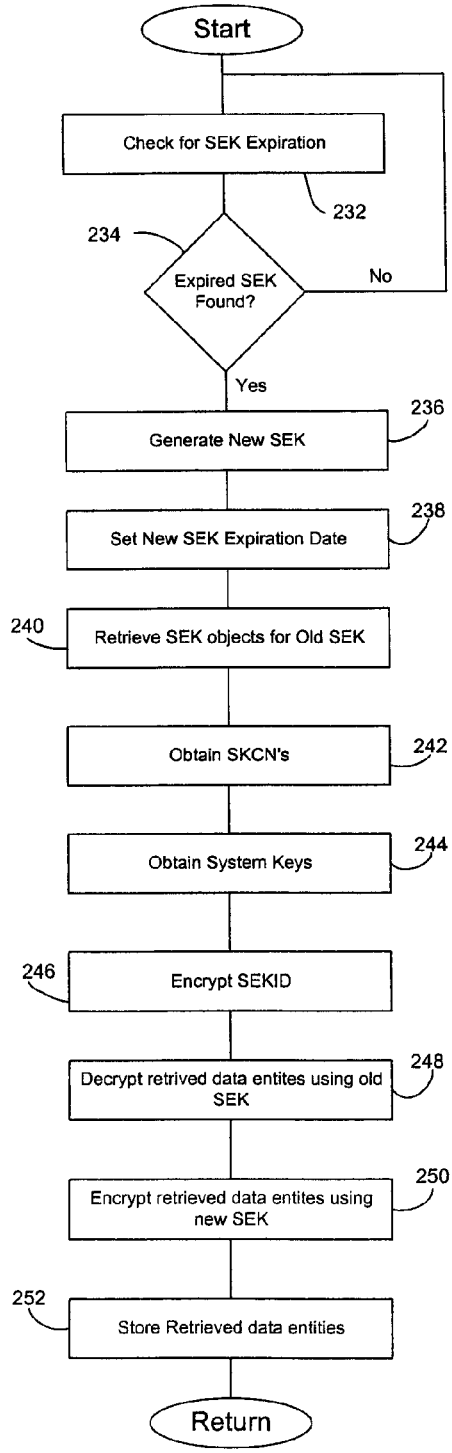
FIG. 13 is a schematic block diagram illustrating the deactivation of session encryption keys.

The computer system 20 also includes a plurality of client business domains 26 having an information database 28. The computer system 20 implements a method according to the present invention. The method broadly includes encryption, decryption and storage of data entities 30 (FIG. 3) as illustrated in the flow diagram of FIG. 10, and the method also includes the retrieval and decryption of data for data manipulation. One embodiment of the retrieval and decryption method is illustrated in the flow diagram of FIG. 11. The computer system 20 utilizes a data structure illustrated in FIG. 3. The data structure broadly includes a plurality of data entities 30 having a security key identification attribute 32, which contains security key information as illustrated in FIG. 4.

Referring to FIG. 1, in addition to the security domain 22 and the client business domains 26, the computer system also includes a plurality of client terminals 34. The client terminals 34 are provided with telecommunications capabilities to communicate with the business domain 26, However, the invention also contemplates the use of alternative communication mechanisms, such as Intranet, local area networks (LAN), and wide area networks (WAN), for example. The Intranet, LAN, and WAN applications may be utilized for any type of facility or organization where data security is important such as a bank, hospital, or law firm, for example. The client terminals 34 gain access to the client business domains 26 only after passing through security devices such as firewalls, and communication between the client business domain 26 and the security domain 22 preferably occurs through an Internet protocol secure, virtual private network tunnel (IPSEC, VPN tunnel) 38.

The security domain 22 includes a primary key server 40, a secondary key server 42, a security key database (KEYDB) 44, and a certification authority server 46. Each of the key servers is a general purpose computer having various components including, for example, one or more processors, fast main memory, and persistent storage. The certificate server 46 also is a general purpose computer.

The primary key server 40 and secondary key server 42 are mirror components. Thus, the primary and secondary key servers are substantially identical. If the primary key server 40 fails, the secondary key server 42 begins operation immediately without disruption in overall system operation, thereby providing fault tolerance. The transfer in operation is accomplished, for example, through a heart beat failover channel between the primary and secondary servers 40, 42. The primary and secondary servers 40, 42 each optionally include a tape backup 48, 50, respectively, for key retrieval in the event that the KEYDB 44 is irretrievable or a key integrity check fails. The primary server 40 is provided with a primary system key reader 52, designated reader #1 in the drawing, and a primary encryption key reader 54, designated reader #2 in the drawing. Preferably, each of the primary readers 52, 54 for the primary server 40 store the same information. Thus, the primary readers 52, 54 are mirrored hardware components for superior fault tolerance. The secondary database 42 also includes a secondary system key reader 56, designated reader #1 in the drawing, and a secondary encryption key reader 58, designated reader #2 in the drawing. Preferably, each of the secondary readers 56, 58 for the secondary server 42 store the same information. Thus, the secondary readers 56, 58 are also mirrored, and there are a total of four readers from which key information can be retrieved. The readers 52-58 comprise security token readers for receiving security tokens. Preferably, the readers comprise Smart Card readers for receiving smart cards. A hardware random number generator (HRNG) 59 is also optionally provided in the security domain to generate random numbers, which are used as identifiers for keys.

In one embodiment, the key servers 40 and 42 contain multiple protection keys that are used to encrypt and decrypt session keys and session key identifiers. The protection keys are themselves stored in a protection store, for example an ASCII flat file, and encrypted in a master key. In one embodiment, the master key can be provided based on a K of M paradigm, under which there are M, for example seven, separate sub-keys that are held by, for example, seven different people. In this embodiment, to unlock the protection key store, a number K, for example three of the seven people must provide their sub-keys. In an alternative embodiment, a weighted K of M scheme is employed, under which some of the M sub-keys are weighted higher than others. In a weighted K of M scheme, for example, a company's CEO can be provided with a sub-key having sufficient weight to unlock the protection store by itself, while subordinates have sub-keys with lower weights based on the subordinate's level of responsibility.

In one embodiment, KEYDB 44 comprises an external disk array with a fault tolerance system for mirrored operation. In an alternative embodiment, the KEYDB 44 is a relational database platform, such as Microsoft™ SQL Server, Oracle™, DB2™, mySQL™, PostgreSQL™, or Jet Engine™. The external disk array or database server optionally includes a redundant array of independent disks (RAID). Each of the key servers 40, 42 is operable to communicate with the KEYDB 44. In one embodiment, the key servers communicates with the database server KEYDB 44 using ADO, ODBC, or a native database interface, such as the interface provided in connection with the Oracle™ database server.

The client business domains 26 preferably include a plurality of application servers 60, 61 and a primary information database 62, which is isolated from the KEYDB 44, and which is a database platform such as the platforms enumerated in connection with KEYDB 44 or alternatively InterSystems Caché™. Preferably, a backup information database 64 is also provided. The backup information database 64 mirrors information in the primary information data 62 providing redundancy and protection against data loss. Thus, the client business domains 26 are provided with superior fault tolerance. For added security, in one embodiment, the client business domain servers 60, 61 are only accessible through a firewall 66. Each application server 60, 61 may contain multiple business logic components such as business logic component number one (BLC1) 68. The BLC's contain instructions and rules for operation of the computer system 20 that are set by users and/or the developers of the users' software applications.

Generally, each client terminal 34 includes a central processing unit (CPU) 70, a data entry mechanism, such as a keyboard 72, and a display or monitor 74. The CPU 70 is operable to control the monitor 74, receive input from the keyboard 72, and establish and maintain communications through the Internet 36 utilizing a modem, two-way satellite, digital subscriber line (DSL), or other communication apparatus (not shown), such as an Ethernet adapter. The CPU 70 is also operable to control other computer system devices such as a printer or disc drives. Preferably, each client terminal is also equipped with a user security token reader for receiving a security token. In a preferred embodiment, the security token reader comprises a Smart Card reader 78 for receiving a Smart Card 80. The Smart Card is optionally provided with a private and secured file system. Each user is optionally provided with his or her own Smart Card 80, which includes a cryptographic for identifying and authenticating the user. Other known solutions, such as user identification and password, can be used to control access and user authentication. In one embodiment, users have one or more roles for authorization. The role identifications can include assistant level, receptionist level, administrative level, and others. The role identifications represent the duties performed by individuals in those levels and the extent of information needed for them to properly perform those duties. The user and role identifications are used as described below in connection with FIG. 7 to limit access to information.

Referring to FIG. 2, the security domain 22 of the computer system 20 includes several software components that are resident on the hardware components illustrated in FIG. 1. The primary and secondary key servers 40, 42 include substantially the same software components and both will be described with reference to the primary key server 40. The primary key server 40 includes several software components: a general security manager (GSM) 82, the encryption key manager (EKM) 24, a system key manager (SKM) 84, a database adapter (DBAD) 86, a key lifetime manager (KLM) 88, and a key auditing manager (KAM) 90. A certificate manager (CM) 92 is provided on the private certificate authority (CA) server 46.

The general security manager (GSM) 82 operates as a gateway to the portions of the computer system 20 located in the security domain 22. To that end, each of the security domain 22 components EKM 24, SKM 84, DBAD 86, KLM 88, KAM 90, CM 92 are preferably not operable to communicate directly with any component outside the security domain 22 of the computer system 20. In one embodiment, they are only operable to communicate with outside components through the GSM 82. Preferably, component mutual authentication occurs between the GSM 82, which is located in the security domain, and the outside business domain components 68. COM+, CORBA, or Java security can be used to control the mutual authentication. Thus, in this embodiment, neither the client user nor any component in the client business domain 26 can contact anything other than the GSM 82 through trusted authentication process.

The GSM 82 is also operable to encrypt the data entities 30 (FIG. 3) using, for example, a three-key, triple data encryption standard (3DES), RC4, or any strong cryptographic algorithm on selected attributes of the data entities 30C, 30D as directed and requested by the BLC's and other components of the computer system 20. Thus, while DES uses symmetric 56-bit key encryption, the GSM preferably uses three-key 3DES, which is a symmetric 168-bit cryptosystem, having an effective key strength of about 110 bits. Other strong cryptographic algorithms can be employed, such as 128-bit IDEA or AES. Using keys with extended lengths makes the keys more difficult to break than the 56-bit DES keys, which have been experimentally broken using parallel processing systems.

The GSM 82 also performs the decryption of the data entities 30 when other components of the computer system 20 request decryption. Further, the GSM 82 is operable to perform hashing operations using message digest 5 (MD5), SHA-1, or other strong hashing algorithms as instructed by other components. The hash values or integrity values generated in the one way hashing process are typically stored as attributes in data entities for integrity check purposes. Preferably, the GSM 82 hashes all of the data attributes of the data entities and stores that data hash value as an attribute. After the data has been decrypted, it is again hashed and the before and after hash values are compared. If the two hash values are identical, the integrity of the data in the data entity has been confirmed. If two hash values are different, an alarm is issued and the data is retrieved from the backup information database 64.

The encryption key manager (EKM) 24, as its name indicates, generally manages encryption keys, which as described below are used to encrypt and decrypt the data entities 30C, 30D. Thus, the EKM 24 is operable to generate multiple session encryption keys (SEK) for example either 3DES or AES and generate session encryption key identifications (SEKID's) for the SEK's. The SEKIDs are random numbers optionally generated with the HRNG 59 (Hardware Random Number Generator). Alternatively, SEKIDs are generated using a software random number generator. The EKM is operable to perform integrity checks on the SEKs using hash values for the SEKs. The EKM is further operable to transmit the SEKID to the SKM 84 for encryption, and the EKM 24 is also operable to transmit the SEK and corresponding SEKID, in encrypted form, to the GSM 82, which then encrypts the data entities 30C, 30D using the SEK.

The system key manager (SKM) 84 generally manages system keys, which as described below are used to encrypt the SEKIDs. Thus, the SKM 84 is operable to encrypt the SEKIDs. In one embodiment, a number of protection keys are used to encrypt SEKs and SEKIDs. It is understood that the number of protection keys used is an operator selectable parameter. In one embodiment, about 20 protection keys are used. In another embodiment, more than about 1,000 protection keys are used. The protection keys are optionally 3DES or AES keys and pointers to protection keys are stored in connection with SEKs. In this embodiment, hidden links, which are transmitted in connection with encrypted data contain several data structures, including a pointer to a protection key, and a cryptographic engine identifier that uniquely corresponds to the cryptographic engine that generated the SEKID.

In one embodiment, separate encryption keys are used to encrypt the SEK and the SEKID. In this embodiment, an encryption key public key is used to encrypt the encryption keys that are used to encrypt the SEKs. Further, a system key public key is used to encrypt symmetric keys that are used to encrypt the SEKIDs. In this embodiment, the SKM also generates a system key common name (SKCN) for the asymmetrical encryption key pairs and system key pairs. In this embodiment, the SKCN's are generated when generating the system public key's digital certificates, so that there is a unique SKCN for each system key pair. In an alternative embodiment, the SEKID is encrypted in a symmetric key that is encrypted in the system key public key. In yet another alternative embodiment, SEKIDs are encrypted in the same symmetric key, called a protection key, as the SEKs.

Upon request from the EKM 24, the SKM 84 is also operable to decrypt the SEKID using the appropriate key. If desired, the SKM 84 and EKM 24 can be combined into a single component and can reside on the same server or computer system.

In one embodiment the Microsoft Crypto API (application program interface) is used to provide cryptographic functionality. In an alternative embodiment OpenSSL™ is used to perform cryptographic functions.

In one embodiment, the key lifetime manager (KLM) 88 monitors the lifetime of the SEK's based on corresponding expiration dates and timestamps. In this embodiment, the KLM 88 flags the expired SEK's with an expiration flag, so that in the next request, the EKM will optionally check the expiration status of the SEK and replace the expired key with a new one during run-time operation.

A particular SEK is used in connection with a particular data object. Accordingly, in one embodiment, an application can save a data entity with the same SEK by resubmitting a hidden link in connection with a request to store the data entity. A hidden link is a data structure including the encrypted SEKID, a pointer to the protection key used to encrypt the SEKID, and a cryptographic engine identifier. Additionally, the application can cause the generation of a new SEK by transmitting a save data request without including a hidden link. In one embodiment, the KLM 88 sets a key expiration flag in connection with the SEK so that an application can be alerted that it is an appropriate time to cause a new SEK to be generated.

In one embodiment, the key auditing manager (KAM) 90 is operable to maintain an active audit log including all transactions involving the SEKs and the keys used to encrypt the SEKs. Generally, the KAM 90 monitors the log for alarm events utilizing smart patterns, rules, and policies. The KAM 90 is also operable to provide notification upon the occurrence of an alarm event, such as if a system key or SEK has been compromised. In an alternative embodiment, operator selectable thresholds for numbers of new key generations are configurable. In this embodiment, an operator can observe the cryptographic system under normal operation, noting a typical number of new keys that are generated over a particular period and set the thresholds accordingly. Once configured, if a threshold is exceeded a notification is sent regarding the exceeded threshold.

The certificate manager (CM) 92 is operable to perform all of the system key PKI related operations. For each system key the CM 92 generates a X.509 digital certificate. Preferably, the digital certificate includes a critical V3 extension, so that only the private certificate authority (CA) can verify the key. Each time a request for decryption by a system key is received by the SKM 84, the CM communicates with the private certificate authority (CA), which is local to the security domain, to verify the system key.

In one embodiment, the database adapter (DBAD) 86 is operable to hide database specific application programming interfaces (API) from the security domain 22 components and thereby controls and enhances communications between the key managers 24, 84 and the secured key database 44. Thus, by using different DBAD's, the security domain components can interface with different types of databases. The DBAD 86 also allows the security domain components to interface with multiple databases within the security domain 22, such as Microsoft SQLServer, Sybase, Informix, Oracle, and IBM DB2. It is understood that known databases employ database fault tolerance. While the preferred operations and locations of the respective components has been described in detail, it is understood that specific tasks can be exchanged between components and the locations of components can be combined, separated, or exchanged without departing from the spirit of the invention.

Figure 3:
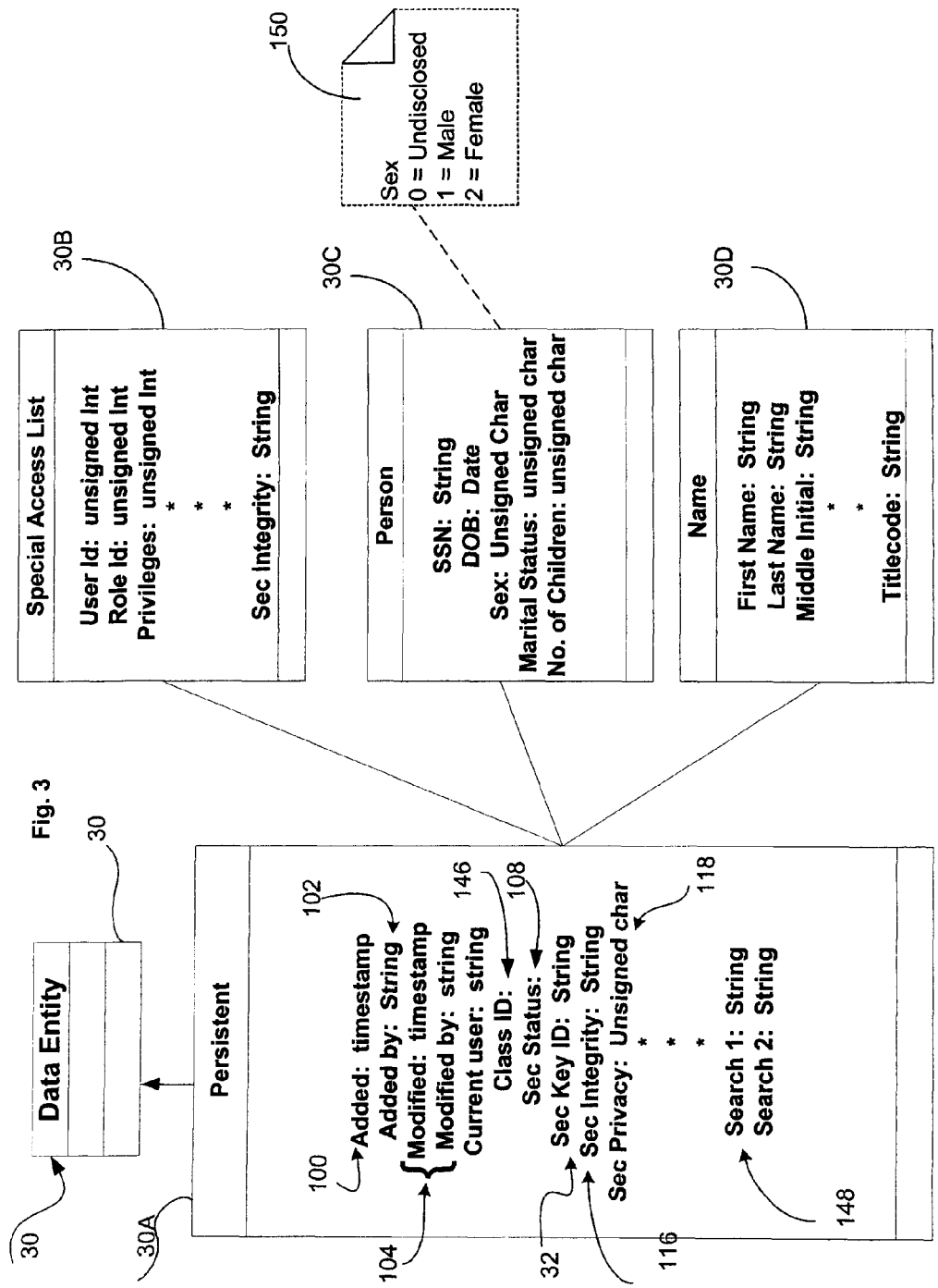
FIG. 3 is a schematic diagram of the database structure according to the present invention and utilized by the computer system of FIG. 1.

Referring to FIG. 3, the database structure preferably comprises an object oriented database structure having a plurality of data entities 30, which are preferably data objects. However, other types of databases are contemplated by the invention. For example a relational database could be used, such as Microsoft SQLServer, Oracle, Sybase, Informix and IBM DB2. Thus, when the term object is used, its counterparts, record for example, are also contemplated, and when the term class is used, its counterparts, table for example, are also contemplated.

One of the data entities 30A, specifically a persistent data entity, is shown in detail. The data entity 30A includes an Added attribute 100 and an Added By attribute 102. The Added attribute 100 records a timestamp containing the date and time the object was added, and the Added By attribute 102 records the digital signature of the user adding the record or data entity. The digital signature is obtained from the digital certificate of the client user's Smart Card 80 or client's current session and user identification. The Modified and Modified By attributes, collectively 104, record the same information for modifications to the data entity 30A. In combination, these non-repudiation attributes 100, 102, 104 inhibit a client user from claiming that the user did not take a certain action. The security status (SecStatus) attribute 108 indicates whether the data object contains plain text or cipher text and whether it is public or private.

Referring additionally to FIG. 4, a security key identification attribute 32 is also an attribute of the data entity 30A and contains security key information. The security key information includes the encrypted SEKID 112 and the SKCN hash value 114, which are used, as described below, to find the SEK used to encrypt associated data entities 30C, 30D and to find the system key used to encrypt the SEKID 112. While it is preferred that the SKCN hash value is stored in the security key attribute 32, the SKCN could be stored in this location without hashing.

Referring again to FIG. 3, the data entity 30A also includes a security integrity attribute (SecIntegrity) 116, which contains the data entity hash value. The data entity hash value is obtained by hashing all or selective attributes within the data entity. This is controlled by business needs and policies, which are preferably determined by the client and recorded in the BLC's. When a data entity is retrieved, it is hashed using, for example, SHA-1 and that data entity hash value is compared with the stored hash value in the security integrity attribute 116. If the hash values are the same, then the integrity of the retrieved data entity is confirmed to be correct and not altered. If the hash values are not identical, then an alarm is issued, so that the data can be optionally manually confirmed, and as described above, retrieved from the backup information database 62.

Figure 7:
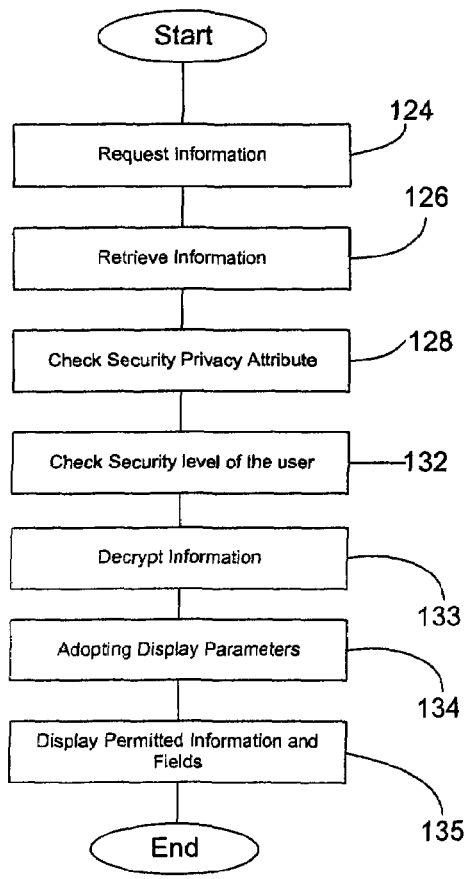
FIG. 7 is a schematic block diagram illustrating the steps for determining how to adapt the display parameters illustrated in FIGS. 5 and 6.
Figure 14:
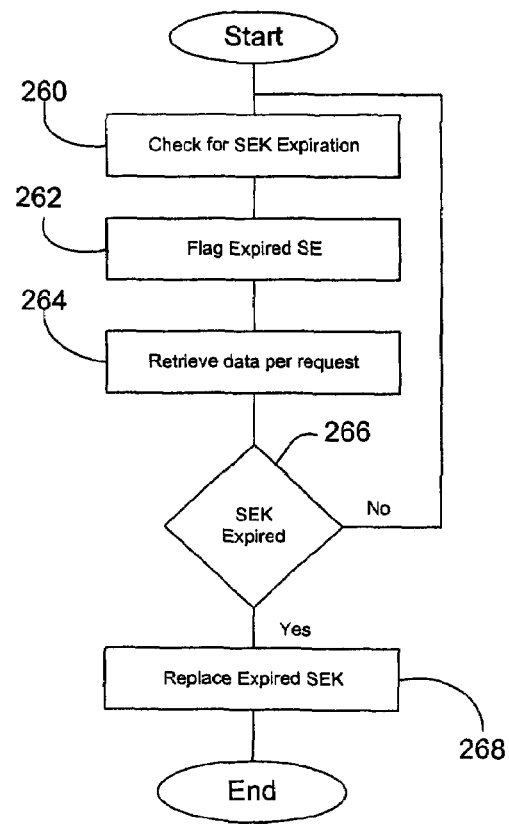
FIG. 14 is a schematic block diagram illustrating an alternate embodiment for the deactivation of session encryption keys.

Referring additionally to FIGS. 5, 6, and 7, a security privacy attribute 118 controls access to the information in the associated data entities 30C, 30D. When a client user, a doctor for example, marks his information private, a special access list (SAL), data entity/class 30B is automatically created and the doctor is automatically added to the special access list. The doctor can thereafter add and delete user identifications attributes 120 and/or role identifications 122 from the special access list. The user attributes 120 are based on specific user identifications from the smart cards or any other authentication method. The role attributes 122 are based on different security levels of users. For example, the doctor may grant permission to view private data to other doctors but not permit nurses to view private data. The roles can include any security level: secretary, shareholder, custodian, and administrative, for example. In this fashion, the doctor controls who can view what information and who can edit what information. The same holds true for patient records; where nurses and doctors may have full access, clerical staff may have limited access to name, address, payment, and appointment information. This privacy can be applied to any vertical market such as banking, intellectual property systems, e-Commerce, law firms, and all applications that deal with highly sensitive or classified information.

When an authenticated client user requests information at step 124 in FIG. 7, the computer system retrieves the information at step 126, which will be described in greater detail below. After the information is retrieved, the system checks the security privacy attribute 118 at step 128. If the information is not marked private, it is fully displayed on the monitor 130 as illustrated in FIG. 6. If the information is marked private, the system checks the security level of the client user at step 132. In checking the user's security level, the system looks at both the user identification and the role identification to see if either are in the special access list, and determine what rights, such as view only or edit, the user has to the information. If the client user has full view rights, then the display of FIG. 6 is again shown. If the client user is not entitled to view the private information, the display parameters are adapted in step 134. In step 134, the display fields of the private information, which will not be displayed, are eliminated from the display parameters with their related labels, so that when the permitted information is displayed in step 135 on monitor 136 of FIG. 5, the fields for the private information are not displayed.

Further, it is envisioned that the fields for the public information may be modified, so that the existence of the private information is completely masked. In the example shown, personal information 138, such as data of birth and number of children are displayed for the user having access to private information. However, for a user without authorization to view the private information, the date of birth and number of children fields are removed from the display of FIG. 5. Further, the home address information 140 and work address information 142 are displayed for the user with authorization to view private information, and the fields specifically indicate which address is for work and which address is for home. In contrast, the user without access to private information not only does not see the home address, the work address fields 144 in FIG. 5 are modified to eliminate the designation that it is a work address.

Referring again exclusively to FIG. 3, the persistent data entity 30A also includes several association attributes, which are used by the database schema to associate or link related data entities 30B, 30C, 30D to the persistent data entities 30A. To that end, the persistent object 30A includes a class identification attribute 146 and at least two search attributes 148. For faster and secured searching, the searchable attributes 148 are preferably hash values of user information such as the patient name. The database uses these attributes 146, 148 and others to associate related persistent objects 30A and related class objects 30B, 30C, 30D with the persistent objects containing the appropriate security key identification 32 that was used to encrypt data attributes in the class objects. Two exemplary class objects are shown in FIG. 3: a person class object 30C and a name class object 30D. Other unillustrated class objects/entities include an address entity, employer entity, payment entity, insurance entity, and others.

The database is also provided with look up maps or notes 150. The illustrated lookup map 150 is for gender of the person class. This saves database resources because every person in the database simply has a 0, 1, or 2 corresponding to undisclosed, male, or female, respectively. Thus, the look up map 150 saves database resources because each person class has a single digit integer instead of a lengthy word entry. Look up maps are also preferably used for the security status attribute 108, the security privacy attribute 118, and others.

Referring to FIGS. 8 and 9, the data structure also includes an SEK object 151 saved in the KEKDB 44 and a SKCN object 152, which is saved in either the KEKDB 44 or in an alternate embodiment, a separate system key database (not shown). Thus, for increased security, several of the data entities are stored in separate databases. In one embodiment, public key pairs are stored in a hardware security module (HSM) device.

The SEK object/entity includes as attributes the SEKID 153 in a normal/decrypted form, the encrypted SEK 154, the SEK integrity check 155, which is a hash value of the SEK, and the optional SKCN hash value 156. The SEK data entity 151 preferably does not include the encrypted SEKID. This creates a hidden link between the encrypted data and the SEK used to encrypt it because the SEKID is encrypted, and the SEK is stored in a separate database. In one embodiment an HMAC is provided for data record integrity also stored in connection with each record in the key database. The secret associated with the HMAC is contained in master security container, which is optionally protected with a K of M encryption scheme. The SEK object also preferably includes a Created On attribute 159, which records a time stamp for the creation of the SEK and optionally a Last Usage Date attribute 161, which records a time stamp for the last time the SEK was used. Additionally, the SEK object optionally has a Usage Counter attribute 163, which records how many times the SEK has been used. The Created On 159, Last Usage Date 161, and Usage Counter 163 attributes provide the client with optional feature selections. Specifically, the client can select to have keys expired a certain number of months, two months for example, after their creation. The client can also preferably decide to have SEK's expire when they have not been used for a selected period of time or when they have been used more than a selected number of times. The client can also choose to have SEK's expired randomly or not at all. The SKCN object/entity includes the SKCN hash value 157 and the SKCN 158 as attributes, and is preferably stored in a database separate from the data entities 30.

Figure 15:
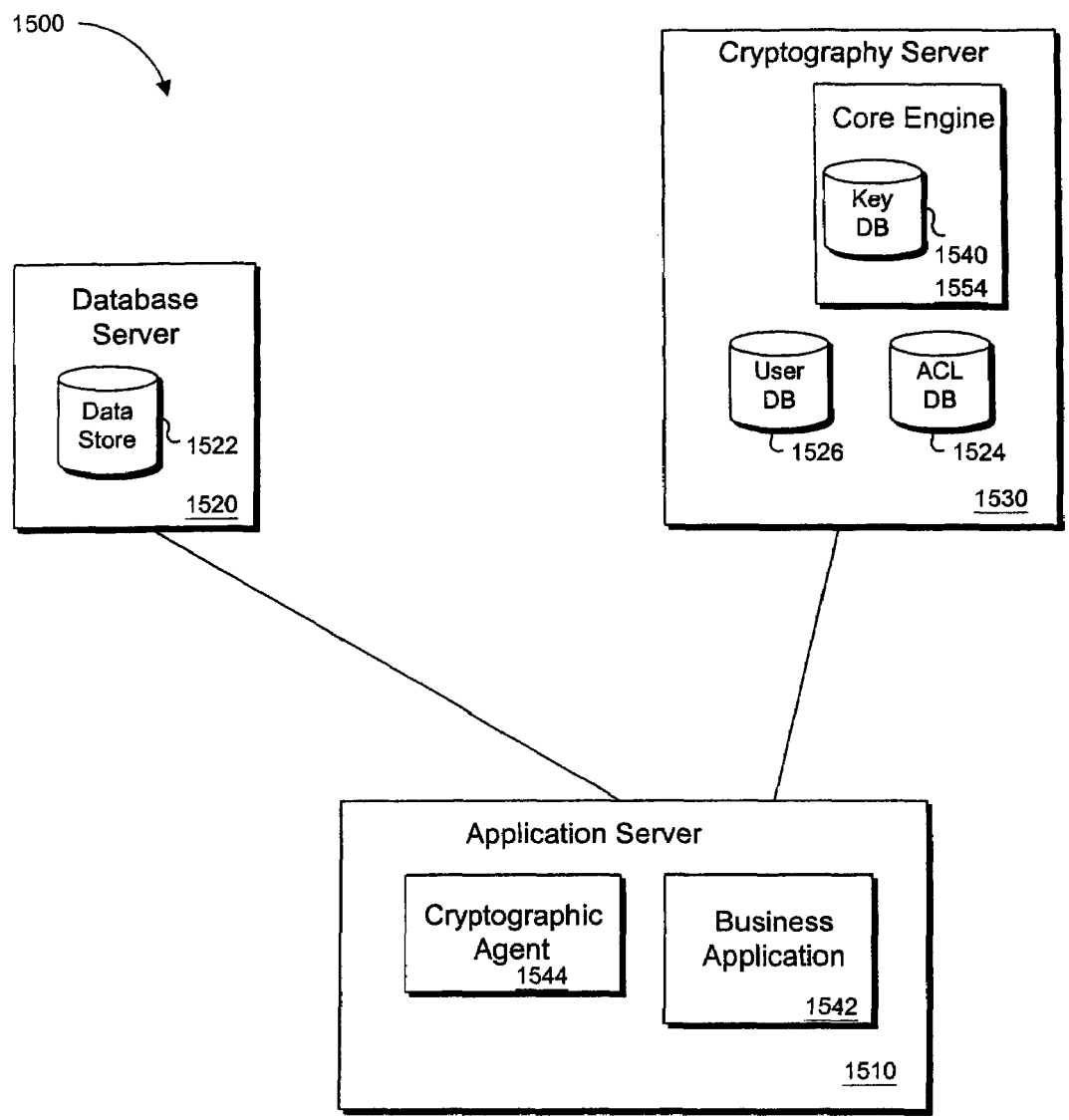
FIG. 15 is a schematic block diagram illustrating a system in which database protection is provided consistent with the present invention.

FIG. 15 is a schematic block diagram illustrating a system in which database protection is provided consistent with the present invention. Distributed application 1500 generally provides an interface to information in database server 1520 by way of application server 1510. Information at rest is protected in database server 1520 by way of SEKs provided by cryptography server 1530. When a requesting user of the distributed application 1500 interacts with business application 1542, the business application 1542 receives any necessary information from the database server 1520. Sensitive information in database store 1522 is encrypted. Accordingly, in order to use the encrypted information, the business application 1542 must decrypt the encrypted information.

The business application 1542 utilizes the cryptography server 1530 by providing the cryptographic agent 1544 with data to encrypt and to decrypt and with an optional hidden link that is stored with the encrypted information in the data store 1522. Further, the requesting user provides authentication information to business application 1542. In one embodiment, the authentication information is the requesting user's user identifier and password, with which a challenge response protocol is performed. In alternative embodiments, authentication information is based on biometrics or smart cards. It is understood that other user authentication mechanisms can be used without departing from the scope of the present invention.

In fulfilling requests from the requesting user, business application 1542 provides the user's authentication information to the cryptographic agent. The cryptographic agent 1544 connects to a core engine associated with cryptography server 1530 over an optionally secure channel, for example an SSL link. The cryptography server 1530 validates the user authentication information in connection with user database 1526. In one embodiment, validation of user authentication information involves a challenge response protocol between the agent and the core engine in which the user's password is used to compute the response to the challenge.

If the user authentication information is valid, a core engine 1554 receives information and instructions to perform operations, such as to encrypt data or decrypt data, from the business application 1542. The cryptography server 1530 optionally determines whether the user is authorized to perform the operations by querying access control list database 1524. If the requesting user is authorized to perform an instruction associated with a particular session key, the core engine 1554 determines which protection key is associated with the requested session key and decrypts the session key with its protection key.

If the business application 1510 needs to decrypt a block of information stored encrypted in the database server 1520, the business application receives the block and its associated hidden link from the database server 1520 and provides the block and its associated hidden link to the cryptographic agent 1544. The cryptographic agent 1544 relays the encrypted block and the hidden link to the core engine 1554. By examining the hidden link, the a core engine 1554 can determine whether the hidden link is was generated locally or whether it is from a foreign cryptography server (not shown) by examining the cryptographic server identifier associated with the hidden link. Further, the core engine can identify the protection key with which to decrypt the encrypted SEKID in the hidden link by examining the protection key pointer contained in the hidden link. The core engine decrypts an encrypted SEKID and uses the decrypted SEKID to access the encrypted session key from a key database 1540.

In one embodiment, looking up the encrypted SEK is accomplished by querying an SEK table having SEKID as a primary relational database-key. The core engine decrypts the encrypted SEK with a corresponding protection key. In one embodiment, the same protection key is used to encrypt the SEKID and the SEK. Accordingly, once the SEKID protection key is identified, it is available to be used to decrypt the SEK. Next, the core engine 1554 decrypts the information the business application 1542 provided from the database server 1520 and transmits the decrypted information back to the business application 1542 through the cryptographic agent 1544. In one embodiment, communication is performed between the cryptographic agent 1544 and the core engine 1554 using an unencrypted TCP session. In an alternative embodiment, communication is carried out using SSL without SSL client authentication. In yet another embodiment, communication between agent and core engine is performed using SSL with client authentication. It is understood that other methods of securing the channel between agent and core engine can be employed without departing from the scope of the invention, such as an unencrypted TCP session over an IPSec VPN.

When a user causes the business application to store information at the database server, the cryptographic agent facilitates encryption of the information before the business application provides the information to the database server. If the business application is storing new information or if the business application has determined that a new SEK should be generated, then the business application provides the unencrypted information without an associated hidden link. When the core engine receives data to encrypt without an associated hidden link, the core engine generates a new SEK and SEKID, encrypts the provided information and the SEKID, combining a protection-key pointer and core engine identifier to form a hidden link, and returns the encrypted information and the hidden link to the business application through the cryptographic agent. Further, the business application stores the encrypted information and the associated hidden link at the database server. When it becomes necessary to access the encrypted information, the encrypted information and the associated hidden link are provided to the core engine and the core engine decrypts the information for the business application if the user has sufficient rights.

When storing information that has an associated hidden link, for example when a field in the database is modified, the business application can elect not to generate a new key. To achieve this result, the business application provides information to be encrypted in connection with the existing hidden link. When the core engine receives information to be encrypted and an existing hidden link, the engine encrypts the provided information with the SEK corresponding to the existing hiddenlink. In this regard, the business application drives the process of generating new session keys for existing data.

Figure 16:
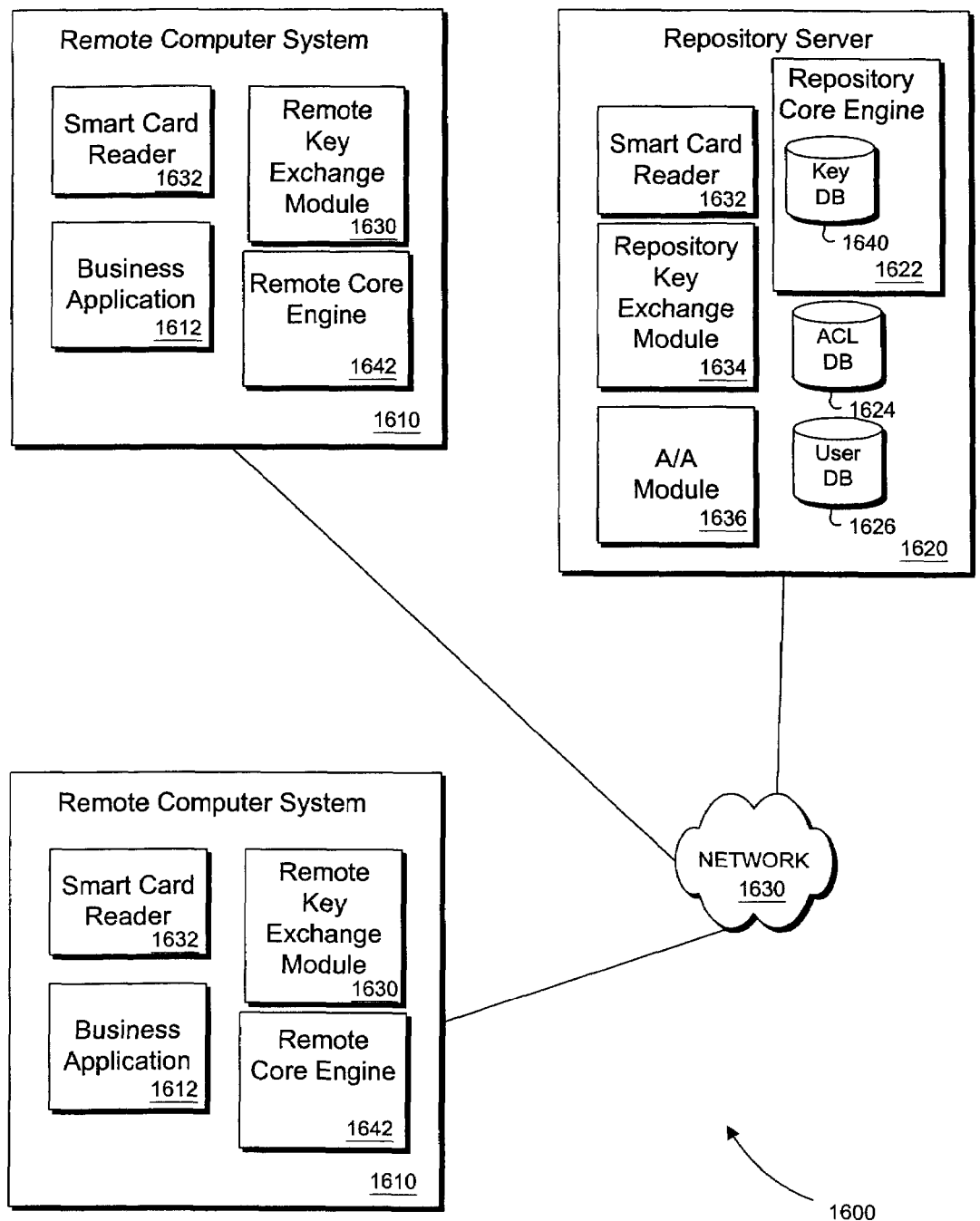
FIG. 16 is a schematic block diagram illustrating a system in which remote computer systems access a key repository over a network.

FIG. 16 is a schematic block diagram illustrating a system 1600 in which remote computer systems access a key repository over a network. One embodiment includes a repository server 1620 that includes a repository core engine 1622. The repository core engine 1622 includes a key database 1640 having cryptographic keys contained within the key database 1640. The repository core engine 1622 provides the functions of key generation, storage, and retrieval.

Further, the repository server 1620 includes an access control list (ACL) database 1624 and a user database 1626. The ACL database 1624 contains information regarding types of allowed access, or rights, particular users have to particular data entities associated with cryptographic keys stored in the key database 1640. The repository server 1620 also optionally has a smart card reader 1632, which is operable to read information from a smart card such as the GEM-159 available from Gem Plus. Further, the repository server 1620 contains a repository key exchange module 1634 and an authentication/authorization (A/A) module 1636. The repository key exchange module 1634 enables two separate cryptographic engines to share keys. The A/A module 1636 identifies and/or authenticates users by, for example, a challenge response protocol in connection with smart cards or user name/password combinations, associated with the users. Further, the A/A module provides user registration functions in connection with the ACL database 1624, which contains information regarding particular users' rights with respect to specific keys.

A remote computer system 1610 connects to a key repository 1620 through a network 1630. The network 1630 is preferably a data network, such as the Internet, but it is understood that the network 1630 can be other types of networks, such as the telephone network, wireless networks, such as 802.11b, Bluetooth™ or other wireless networks, local area networks, wide area networks, or optical fiber networks. In one embodiment, the computer system 1610 contains a smart card reader 1632, which is operable to enable a user to authenticate himself or herself to the repository core engine 1620. Further, the remote computer system 1610 contains a remote key exchange module 1630, which is operable to exchange keys with the key exchange module 1634 of the key repository 1620. In one embodiment, the remote computer system 1610 also contains a storeless remote core engine 1642 that is operable to perform remote encryption and decryption functions on the remote computer system 1610. A storeless remote engine has no internal key database and must communicate with a repository server to obtain keys to encrypt or decrypt data.

A business application 1612 is also preferably associated with the remote computer system 1610. The business application 1612 is generally software that consumes and produces information that is protected by cryptographic methods and systems consistent with the present invention.

Figure 17:
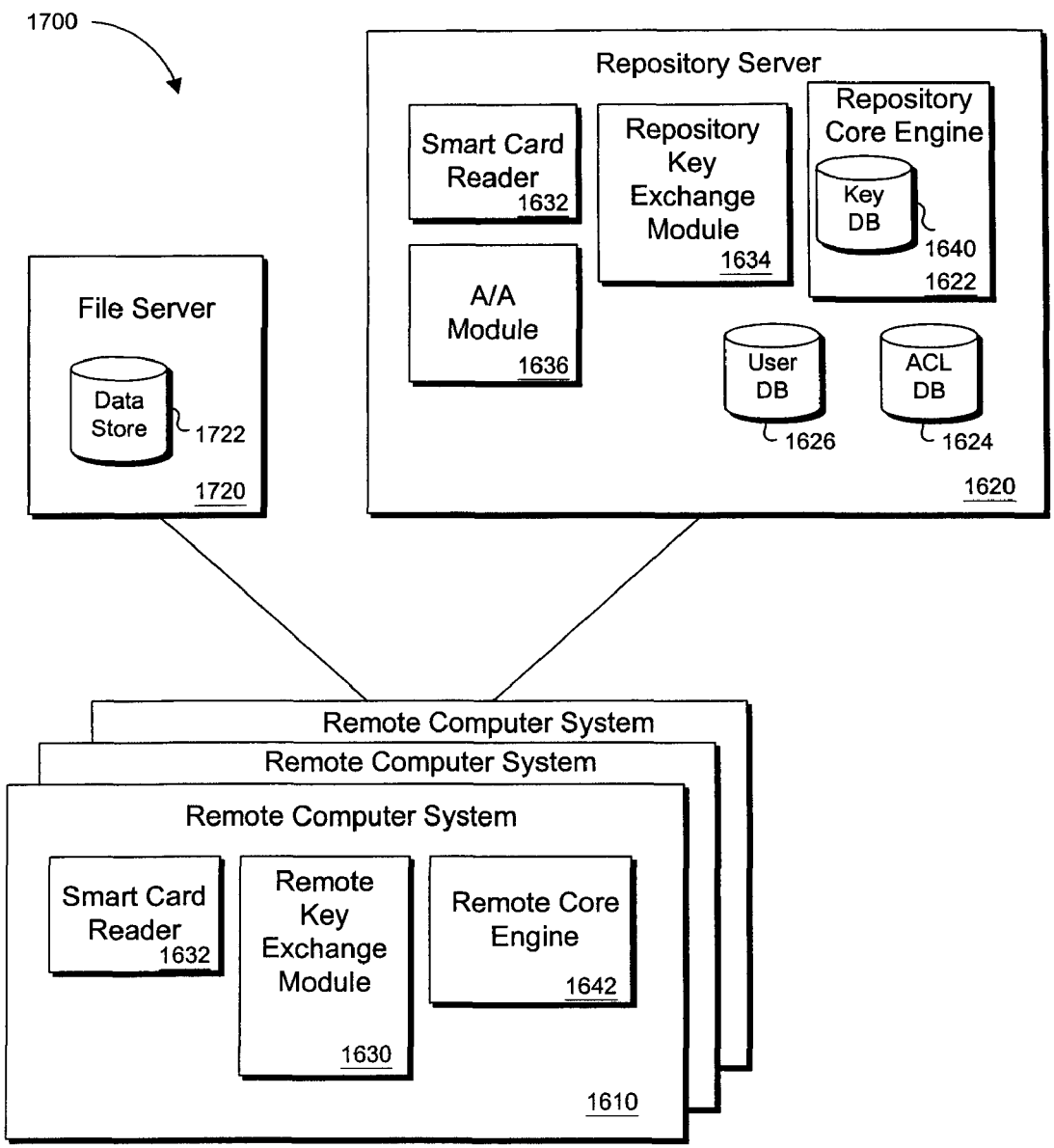
FIG. 17 is a schematic block diagram illustrating a system involving a file server, a repository server, and remote computer systems.

FIG. 17 is a schematic block diagram illustrating a system 1700 involving a file server 1720, a repository server 1620, and a remote computer system 1610 in a group of remote computer systems. The file server 1720 includes a data store 1722, which contains information that is protected with cryptographic methods and systems consistent with the present invention. The information contained in the data store 1722 is encrypted and decrypted in connection with the remote computer system 1610, using the remote core engine 1642, which performs the functions of encrypting and decrypting information using keys from the repository server 1620, which optionally contains a smart card reader 1632, a repository key exchange module 1634, and an authentication/authorization (A/A) module 1636. The repository server 1620 also contains a user database 1626 and an ACL database 1624. The remote computer system 1610 optionally uses a smart card reader 1632 and a remote key exchange module 1630 to authenticate with the A/A module 1636 of the repository server 1620 to obtain appropriate keys to encrypt and decrypt information in the media store 1620. The remote core engine 1622 performs encryption and decryption functions.

In connection with the cryptographic systems of FIGS. 16 and 17 several operations are performed, including: (i) adding a user to the cryptographic system; (ii) providing an interface for a user to log in and to thereby authenticate himself or herself to the cryptographic system; (iii) encrypting a new file; (iv) maintaining, which is accessing or changing, ACLs associated with keys; (v) blocking access to a key that has become compromised; reassigning ownership of a cryptographic key; and (vi) accessing and decrypting existing information for use in connection with a software application.

The process of adding a new user optionally involves generating exchange and signature key pairs for users. In one embodiment, the key pairs are written to a smart card. The exchange key is used for transporting session keys between the repository server 1620 and the remote computer system 1610. The signature key is used to authenticate the user via the A/A module 1636.

In one embodiment, the public keys associated with the newly generated user key pairs are stored in the user database 1626. Optionally, other information, such as name and contact information for a user can be stored in the user database 1626. Further, the user takes possession of the smart card containing the key pairs so the user can perform authentication and key exchange operations in connection with the use of encrypted information.

In connection with the smart card, the user logs into the cryptographic system by authenticating to the A/A module 1636 of the repository server 1620. First, the user places his or her smart card into the smart card reader 1632 and the remote core engine 1642 reads the keys from the smart card. The smart card is preferably password protected.

Once the remote core engine 1642 has access to the private key of the signature key pair, it authenticates itself to the repository server 1620 by way of the A/A module 1636. In one embodiment, the A/A module 1636 and the remote computer system 1610 execute a challenge response protocol in connection with the user's signature key pair. In this embodiment, the A/A module verifies a signature made by the remote computer system 1610 by using the public key stored in the user database 1626 that was generated at the same time as the user's private key, when the user account was created. Next, the remote computer system optionally receives a session-level access token, for example a large random number, in connection with the challenge response protocol. In an alternative embodiment, a user authenticates using its user identifier and, for example, password. In one embodiment, user and agent rights are granted based on rights associated with a role that is assigned to the user or agent. Further, if the user or agent has sufficient rights, an ACL corresponding to a particular key is examined to determine whether the user or agent has sufficient rights to cause the key to be used to encrypt or decrypt data.

Figure 18A:
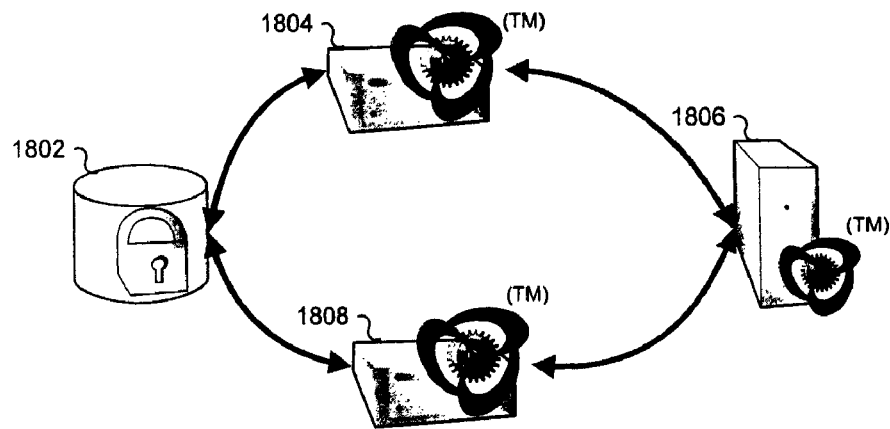
FIG. 18A is a schematic block diagram illustrating intradepartmental data protection consistent with the present invention.

FIG. 18A is a schematic block diagram illustrating intradepartmental data protection consistent with the present invention. In this embodiment, the cryptographic engines are represented in connection with the TRICRYPTION trademark of ERUCES, Inc. of Lenexa, Kans. The environment broadly includes a data store 1802, computer systems 1804 and 1808, and repository server 1806. The data store 1802 contains, for example, encrypted files that are manipulated by computer systems 1804, 1808. The remote computer systems 1804, 1808 read and write the encrypted data in data store 1802 in a manner similar to that explained in connection with FIG. 15. However, in this embodiment, encryption and decryption is performed on the same computer system that manipulates the information, namely systems 1804, 1808. To accomplish this, remote computer system 1804 uses its remote key exchange module to obtain keys from repository server 1806 as explained in connection with FIGS. 16 and 17. Specifically, the remote computer systems 1804, 1808 manipulate the encrypted information in data store 1802 using session keys obtained from the repository server 1806.

Figure 18B:
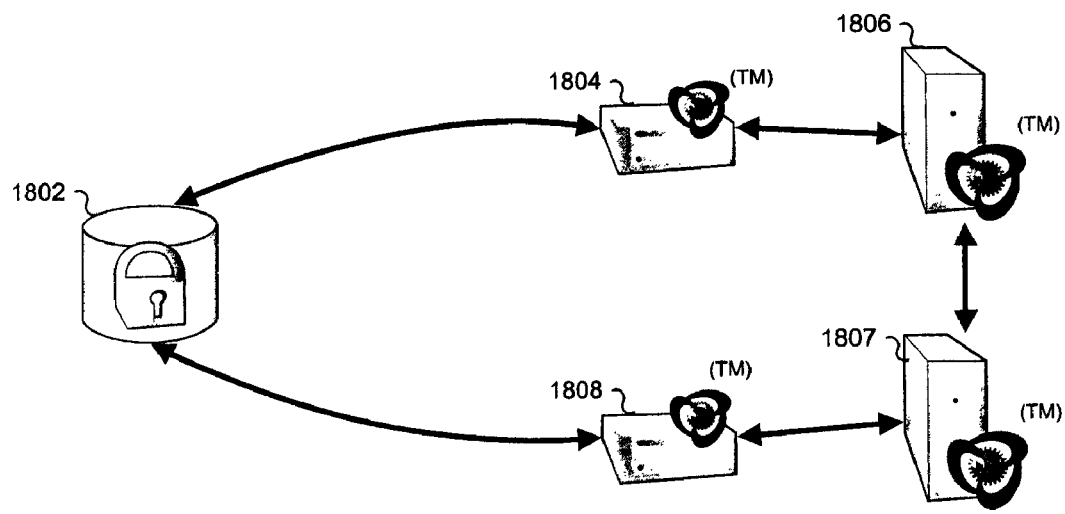
FIG. 18B is a schematic block diagram illustrating interdepartmental data protection consistent with the present invention.

FIG. 18B is a schematic block diagram illustrating interdepartmental data protection consistent with the present invention. In this embodiment, information contained in the data store 1802 is accessed by remote computer systems 1804, 1808 that are in separate departments or enterprises. Accordingly, user authentication and authorization information associated with a particular user of remote computer systems 1804 and 1808 resides in a corresponding repository server 1806 or 1807 in the user's department.

It may be useful for the user of the remote computer system 1804 to access information for which the user of the remote computer system 1808 is the key owner. If a user needs to access information protected by a key contained in a repository server located in another department, then interdepartmental key exchange is employed. To accomplish interdepartmental key exchange, repository server 1806 and repository server 1807 exchange keys using mechanisms described in connection with FIGS. 16 and 17. Once a user's departmental repository server has received the appropriate session key from a peer departmental repository server, the local repository server can either provide the key to a storeless cryptographic engine, such as computer system 1804 or perform the encryption or decryption for an agent directly in the core engine of the storeful repository server.

Figure 18C:
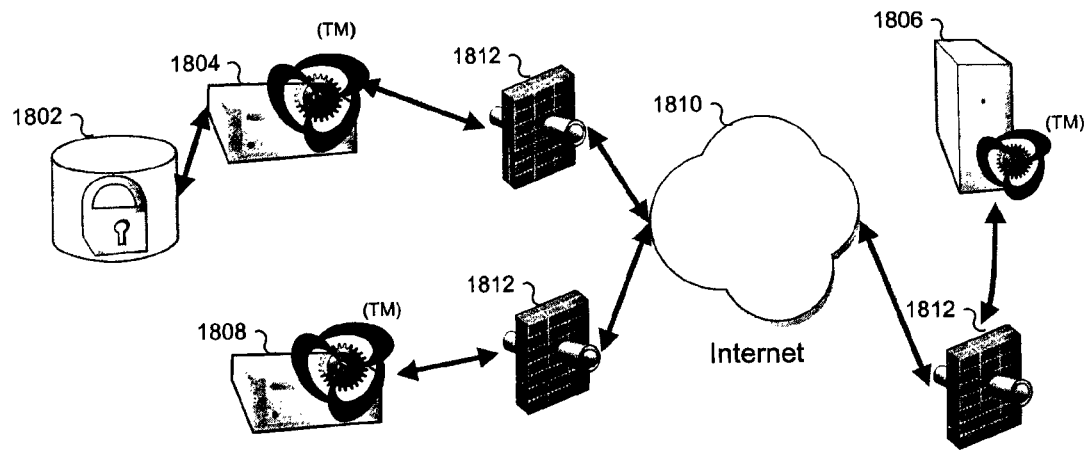
FIG. 18C is a schematic block diagram illustrating data protection in connection with an Intranet or extranet based key repository.

FIG. 18C is a schematic block diagram illustrating data protection in connection with an Intranet or extranet based key repository. In this embodiment, the repository server 1806 is separated from the remote computers 1804 and 1808 by a public network 1810 and optional firewalls 1812. Because of the secure nature of the key exchange between repository server 1806 and remote computer systems 1804 and 1808, exchanging keys over the public network is secure, and the keys can be used to manipulate the encrypted data in data store 1802.

Figure 18D:
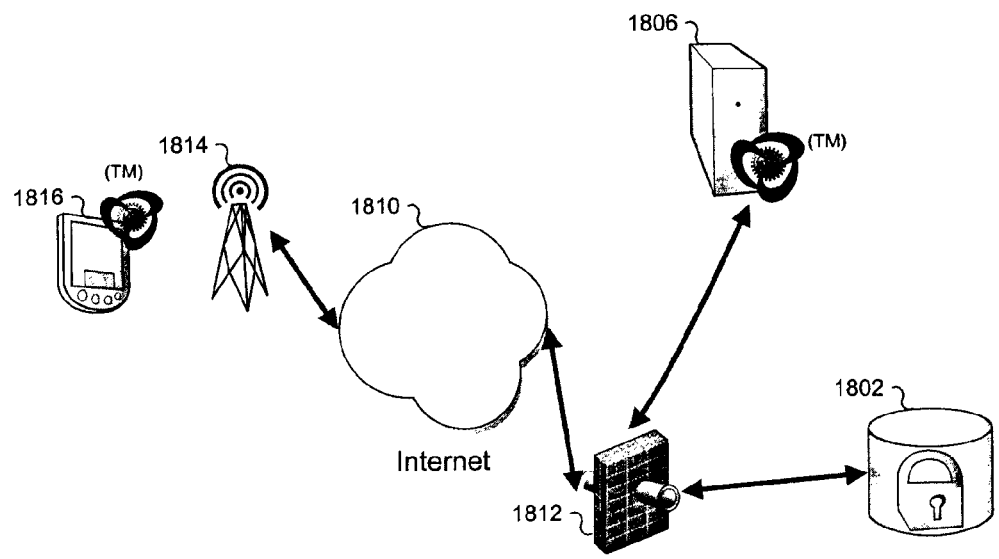
FIG. 18D is a schematic block diagram illustrating mobile data protection.

FIG. 18D is a schematic block diagram illustrating mobile data protection. In this embodiment, mobile computer 1816 is connected through wireless access point 1814. The mobile computer 1816, such as a personal digital assistant, contains a version of a storeless cryptographic engine that is capable of performing key exchange with repository server 1806. The mobile computer system 1816 can securely retrieve the encrypted data from data store 1802 over the public network 1810 through optional firewall 1812 because of the strong cryptography used to store the information in data store 1802, and the mobile computer can securely receive session keys from repository server 1806 using key exchange methods described above.

Figure 18E:
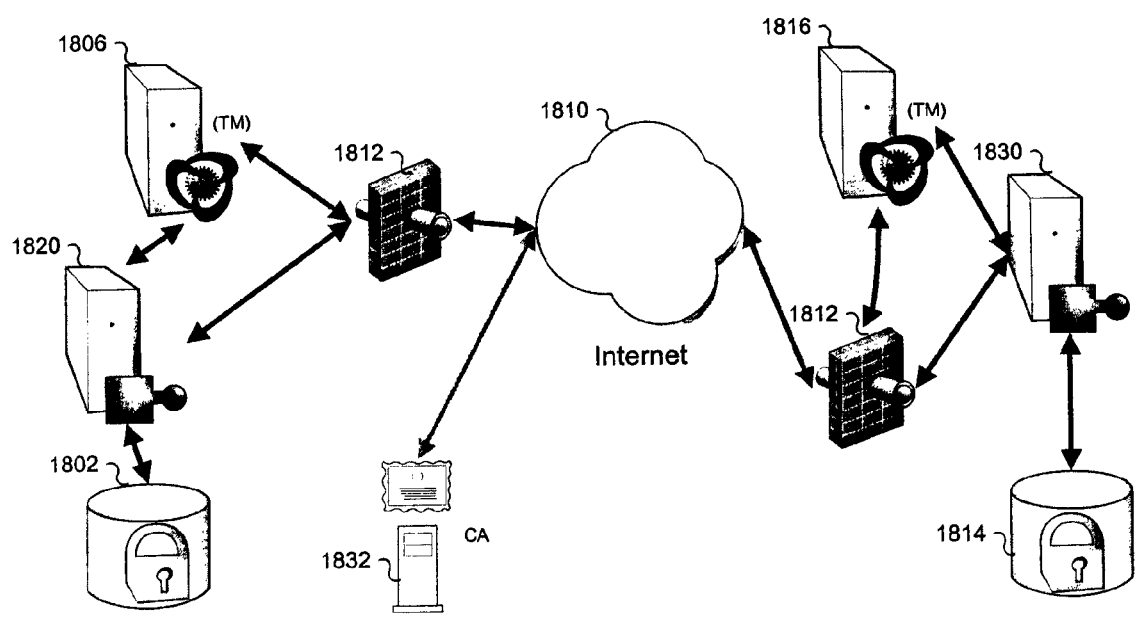
FIG. 18E is a schematic block diagram illustrating data protection in a multiple enterprise environment.

FIG. 18E is a schematic block diagram illustrating data protection in a multiple enterprise environment. In this embodiment, information can be securely shared between enterprises over the public network 1810. Data store 1802 contains encrypted information that can be provided to internal users via application server 1820 and to users of peer enterprises through their application servers, for example application server 1830. Secure and granular sharing of information between enterprises over the public network 1810, through optional firewalls 1812, is possible because of the secure key exchange between repository servers 1806 and 1816 that reside in different enterprises. Trust is optionally established between the repository servers 1806 and 1816 by way of signed certificates from certification authority 1832, such as VeriSign Inc. of Mountain View, Calif.

Figure 19:
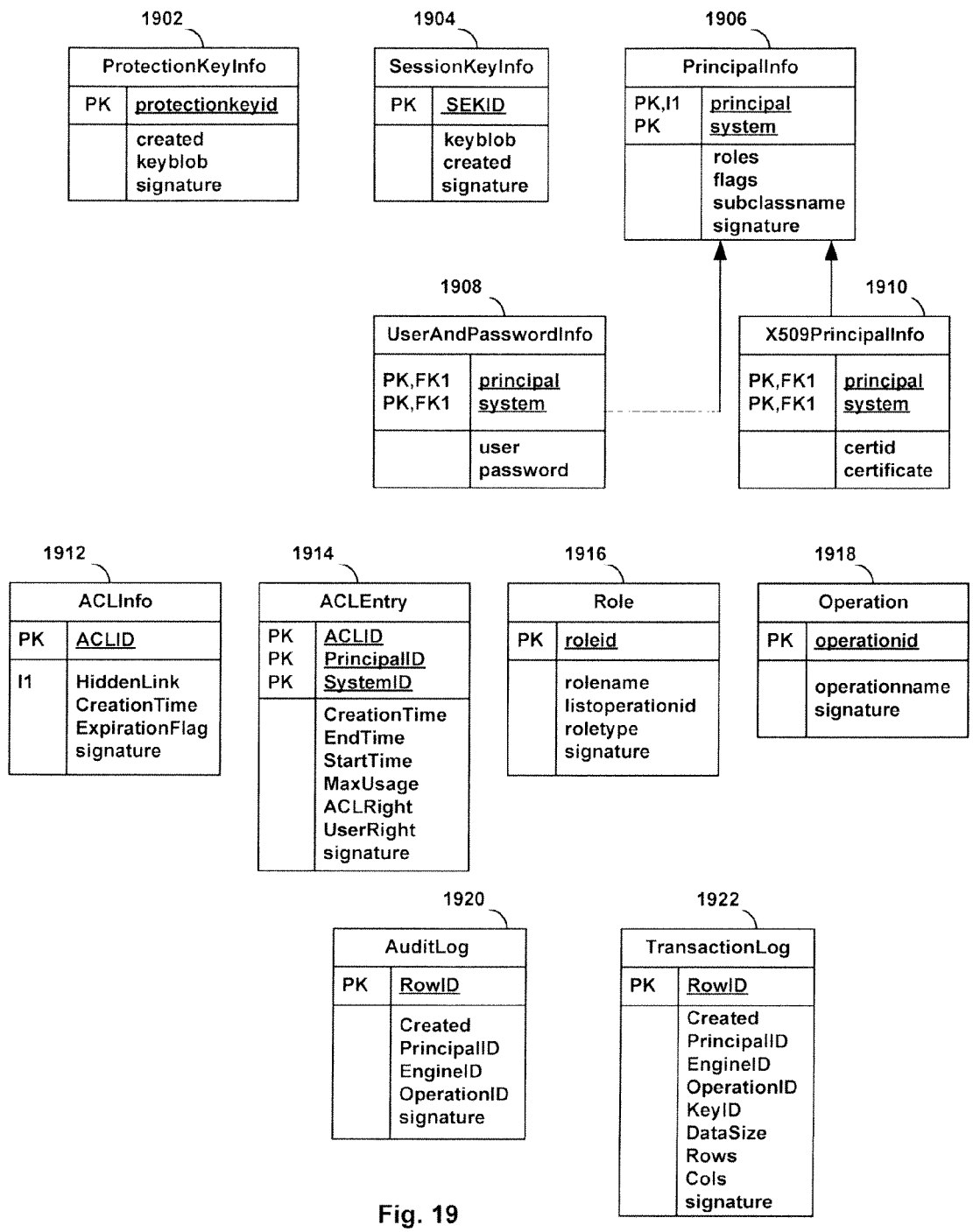
FIG. 19 is a schematic block diagram illustrating an embodiment of tables corresponding to key, access control, and user databases.

FIG. 19 is a schematic block diagram illustrating an embodiment of tables corresponding to key management, access control, and user databases. A protection key information table 1902 has the primary key of protection key identifier (protectionkeyid). The protection key information table 1902 contains the columns of "created," which is a time stamp, "keyblob," which is an encrypted binary representation of the protection key, and a signature which is, for example an HMAC data authenticator. In one embodiment, the "keyblob" field is encrypted in a master key that is protected at rest by a K of M encryption scheme. An session key information table 1904 is also provided. The session key information table has a primary key called "SEKID," which corresponds to an unencrypted SEKID. Accordingly, once a core engine decrypts an SEKID from a hidden link, it can identify and decrypt "keyblob" from the session key information table 1904. The session key "keyblob" is preferably encrypted with the same protection key as the SEKID. In the session key information table 1904 and the other tables illustrated in FIG. 19, the "created" and "signature" fields are analogous to the "created" and "signature" fields described in connection with the protection key information table 1902.

A principal information table 1906 has primary database keys of "principal" which corresponds to the name of a user, agent, or server that accesses a cryptographic system consistent with the present invention. The "roles" field corresponds to the roles assigned to a particular principal. The "flags" field corresponds to status indicators associated with the principal, e.g. disabled principal or non-disabled principal. The "subclassname" field is used to indicate, for example whether the principal uses user name/password authentication or X.509 authentication.

User and password information table 1908 and X.509 principal information table 1910 are related to the principal information table 1906. The user and password information table 1908 contains user identifiers and password information for corresponding users. In one embodiment the "password" field contains an encrypted SHA-1 hash of the password initially set by the user. In this embodiment, the "password" hash is encrypted with a master key that is protected by a K of M encryption scheme. The X.509 principal information table 1910 contains certificates corresponding to principals, for example the certificates of remote cryptography servers that exchange keys with the presently described core engine. ACL information table 1912 has a primary database key of an ACL identifier used to relate the table to an ACL entry table 1914. The ACL information table contains one record for each key, including the key's hidden link, the ACL's creation time and the key's expiration flag. The ACL entry table 1914 has a primary key including an ACL identifier a principal identifier and a system identifier, which corresponds to a core engine identifier that uniquely identifies the particular core engine that generated the key.

A role table 1916 has a role identifier (roleid), a role name, a list operation identifier, and a role type, which identify and define the rights associated with a particular role. The operation table 1918 contains an operation identifier and operation names, which are used to associate names of operations with actual operations that a user is authorized to perform in connection with a particular core engine.

Audit log table 1920 and transaction log table 1922 are used to collect records that define events as they take place in a core engine. The audit log table 1920, for example contains information about the principal that performed a particular operation. The transaction log table 1922 contains information about, for example encryptions and decryptions that were performed by the core engine.

Figures 20, 21:
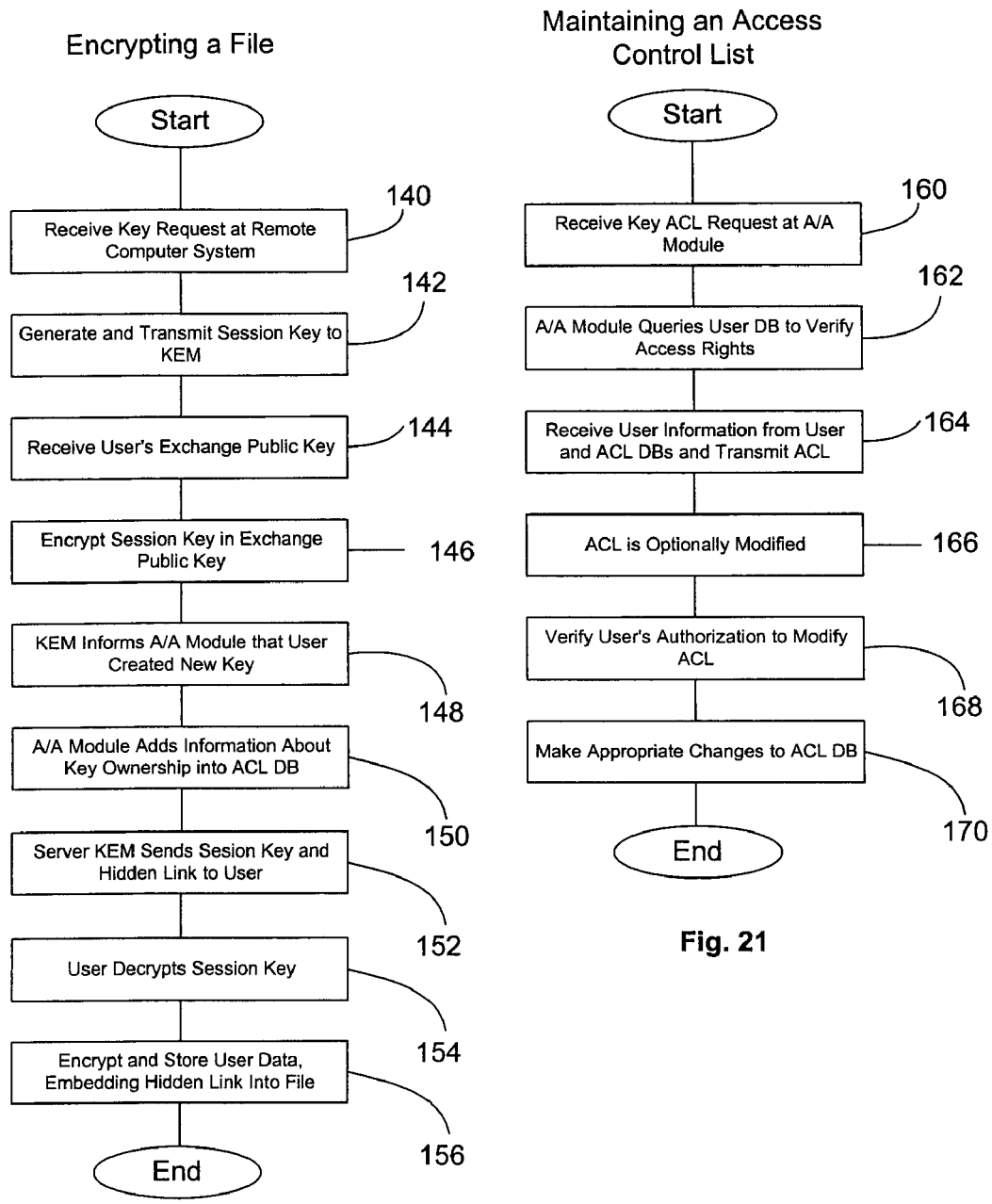
FIG. 20 is a schematic block diagram illustrating a process of encrypting a file consistent with the present invention.
FIG. 21 is a schematic block diagram illustrating a process of maintaining an access control list.

FIG. 20 is a schematic block diagram illustrating a process of encrypting a file. First a request for a key is made by a user at the cryptographic server (stage 140). Next, the repository core engine optionally creates and transmits a session key to the key exchange module (stage 142). Next, the repository engine receives the user's exchange public key (stage 144). The exchange public key is the public key associated with the exchange key pair that is used to exchange session keys between key exchange modules. Next, the key repository encrypts the session in the exchange public key (stage 146). Next, the key exchange module informs the A/A module that the user created a new session key (stage 148). A new session key can be created, for example, when the application elects to cause generation of a new key by saving a new data object or saving an existing data object without providing a corresponding hidden link. Next, the A/A module adds information about key ownership into the ACL database (stage 150). In one embodiment, the owner of a key has full access to information protected by the key. Further, in this embodiment, the owner can grant rights to information protected by the key to other users. Next, the server key exchange module 1530 sends a session key and a hidden link to the remote computer system, encrypted in the user's exchange public key (stage 152). Next, the user decrypts the session key using the private key associated with the exchange key pair (stage 154). Next, the remote core engine 1540 encrypts the user data and the user application embeds the hidden link into a data structure, such as a file structure, associated with the user data (stage 156).

FIG. 21 is a schematic block diagram illustrating a process of maintaining an access control list (ACL) of a key. First, a user requests the ACL of an existing key from the key repository, and the A/A module receives the ACL request (stage 160). Next the A/A module queries the user and ACL databases to determine whether the user has adequate rights to view an ACL associated with a particular key (stage 162). In one embodiment, information regarding other users having rights associated with the key is obtained from the user database. Next, user information is obtained from the user database and the ACL database and the ACL is transmitted to the user (stage 164). Next, the ACL is optionally modified by the client, for example to add or remove rights in a particular key to a particular user (stage 166). Next, the A/A module verifies that the user has adequate rights, for example by reference to the original ACL, to modify the ACL (stage 168). Finally, the key repository makes appropriate changes to the ACL within the ACL database (stage 170).

FIG. 22 is a schematic block diagram illustrating a process of accessing an encrypted file. First, a file server provides encrypted information to the user, by way of the remote computer system (step 180). Next, the repository server verifies that the user has the rights to access the key necessary to decrypt the information provided by the file server (stage 182). Next, the key is transmitted to the key exchange manager (stage 184). The repository server then retrieves the User's exchange public key from the user database (stage 186). Next, the repository key exchange manager re-exports the session key (stage 188). Next, the repository key exchange module sends the encrypted session key to the user, encrypted in the user's exchange public key (stage 190). Next, the user decrypts the session key using the user's exchange private key (stage 192). Further, the remote computer system decrypts the user data (stage 194).

FIG. 23 is a schematic block diagram illustrating a process of blocking access associated with a key in response to the key becoming compromised. First, the repository server receives information regarding a compromise of a remote computer system or of a smart card (stage 196). Next, the repository operator receives a connection from an authorized representative of the user (stage 198). Further, if the authorized representative is successfully authenticated, the keys are disabled, for example by removing all users from the ACL associated with the compromised key (stage 200).

In one embodiment, trusted software components are executed in connection with cryptographic systems consistent with the present invention. The purposes of using trusted components in connection with a cryptographic system include the ability to verify the identity and authenticity of software. Verification of software is important, because the introduction of rogue software into a functioning cryptographic system can defeat the cryptographic system.

One way to determine the authenticity of software is to verify its identity. In general, identity can be established based on something's inherent characteristics, based on knowledge of a secret, or based on possession of something, for example a credential or a secret. However, knowledge of a secret or possession of a secret such as an embedded key has proved to be problematic. For example, persistent computer users have been able to locate and extract keys hidden within software. Accordingly, establishing identity based on software's inherent characteristics is preferred. But merely having the name of a file containing source code is insufficient to establish identity. A "fingerprint" that uniquely identifies the file is preferred. A fingerprint can be verified at run-time before executing software to verify the identity of the software.

Figure 24:
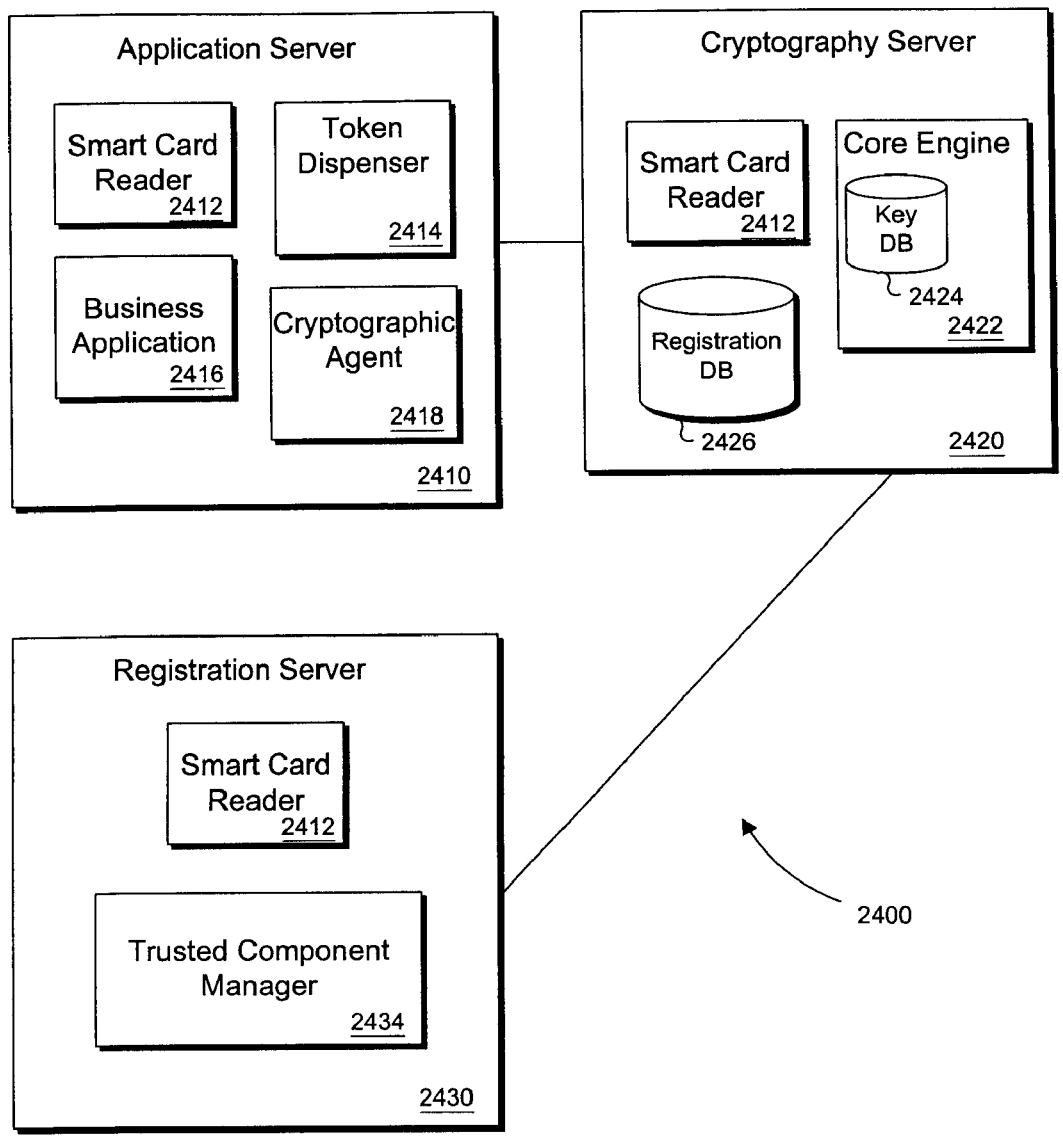
FIG. 24 is a schematic block diagram illustrating a system in which trusted components are authenticated.

FIG. 24 is a schematic block diagram illustrating a system in which trusted components are authenticated. An application server 2410 and a registration server 2430 are provided. It is understood that the application server 2410 and the registration server 2430 can be implemented as separate threads or processes on a single computer system. Alternatively, the application server 2410 and the registration server 2430 are implemented on separate computer systems. A cryptography server 2420 is used in connection with the application server 2410 and the registration server 2430 to provide cryptographic functions in connection with the verification of trusted components.

The application server 2410 optionally includes a smart card reader 2412 that reads key information from a smart card. Token dispenser 2414 provides a cryptographic token in connection with verification of trusted components. Cryptographic Agent 2418 provides the cryptographic functions necessary for the application server 2410 to communicate securely with the cryptography server 2420 and to authenticate a business application 2416. The registration server 2430 includes the smart card reader 2412 and a trusted component manager 2434 that is used to gather and process information about trusted components.

The cryptography server 2420 includes a registration database 2426 and the optional smart card reader 2412, Further, the cryptography server 2420 includes a core engine 2422, which also contains a key database 2424, containing cryptographic keys. Trusted component authentication systems are further described in connection with FIGS. 24-27.

Figure 25:
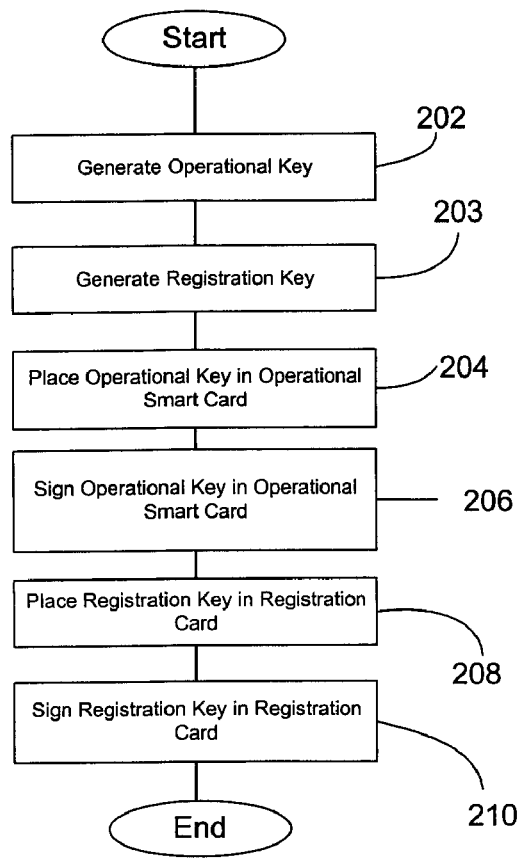
FIG. 25 is a schematic block diagram illustrating a process of creating smart cards.

FIG. 25 is a schematic block diagram illustrating a process of creating smart cards. In one embodiment, two secret cryptographic keys are generated during the installation or configuration of the cryptography server 2420. First, an operational key is generated (stage 202). In one embodiment, the operational key is used to secure communication between the cryptographic agent and the cryptography server. In one embodiment, the operational key is read into separate machines containing the cryptographic agent and the cryptographic server from a smart card. In this embodiment, a "fingerprint" corresponding to the cryptographic agent is also contained in the smart card. Using the stored "fingerprint" of the cryptographic agent, the cryptographic server can verify the authenticity of the cryptographic agent. Next, a registration key is generated (stage 203). The registration key is used by a system administrator during the registration process to register a trusted component. Next, the operational key is placed into an operational smart card (stage 204), and the operational key is optionally signed, for example by a trusted entity (stage 206). In one embodiment, the operational key is signed with a signing key associated with the cryptography server 2420. Next, the registration key is placed in a registration smart card (stage 208). Further, the registration key is signed by a trusted signer (stage 210).

Figure 26:
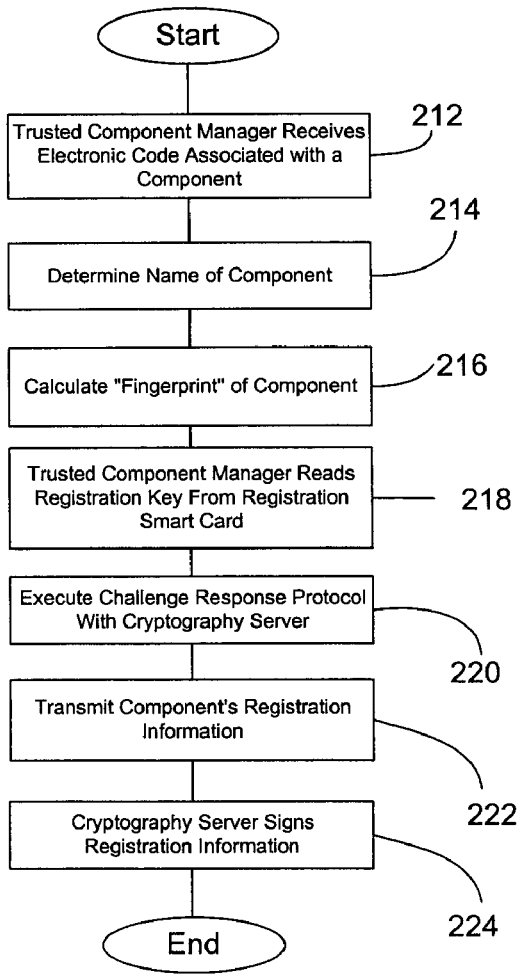
FIG. 26 is a schematic block diagram illustrating a process of registering components.

FIG. 26 is a schematic block diagram illustrating a process of registering components. First, the trusted component manager 2434 receives software in the form of electronic computer code associated with a software component, such as business application 1542 (stage 212). Next, the trusted component manager 2434 determines the name of the component, for example by performing an operating system call to determine the name of a file associated with the component (stage 214). Next, the trusted component manager 2434 calculates a "fingerprint" of the trusted component, for example by applying a hash function like MD5 or SHA-1 to the component (stage 216). Next, the trusted component manager 2434 reads the registration key from the registration smart card (stage 218). Accordingly, users that do not have access to the registration smart card do not have the ability to register a component. Next, using the registration key, the trusted component manager 2434 uses the registration key pair to perform a challenge response protocol with the cryptography server (stage 220) and to securely send the component's information to the cryptography server (stage 222). Further, the cryptography server signs the newly registered component's registration information, including, for example, the "fingerprint" (stage 224), and the registration information is stored in a database.

Upon restart of the application server 2410, token dispenser 2414 receives information from the operational smart card by way of the smart card reader 2412. In one embodiment, after the smart card is inserted, a user must provide a password.

Figure 27:
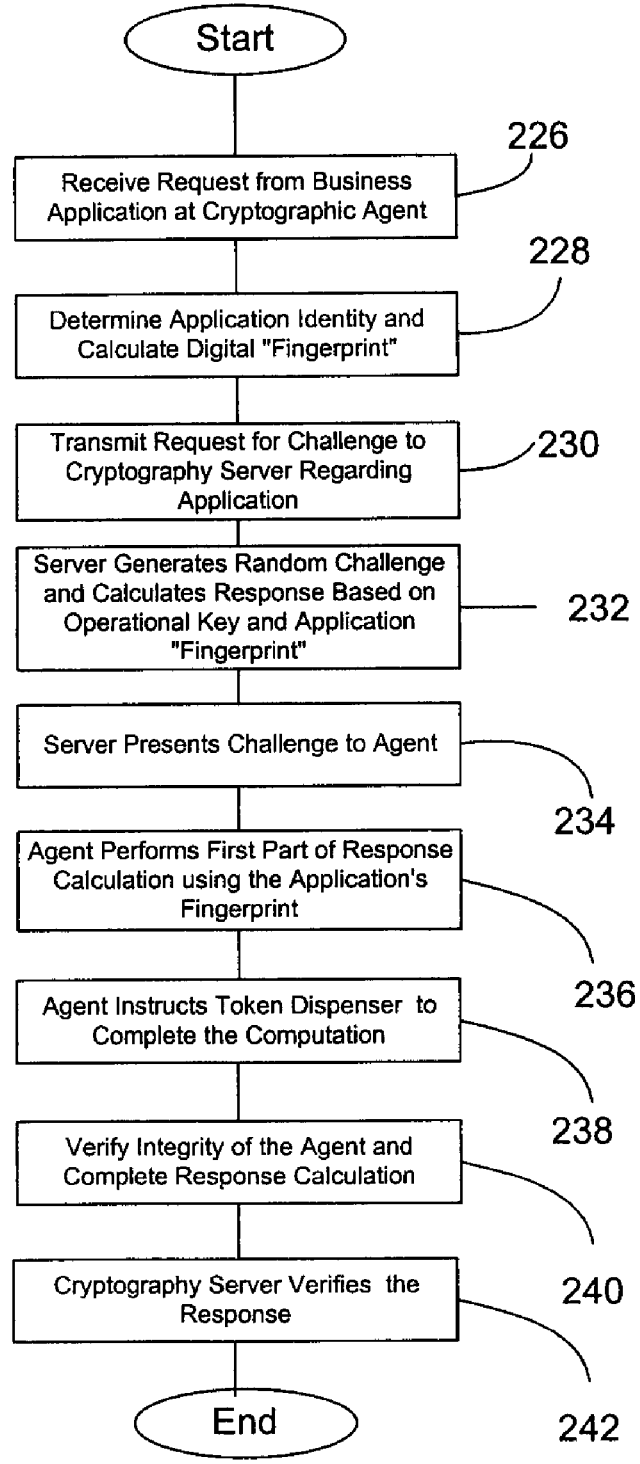
FIG. 27 is a schematic block diagram illustrating a process of performing run-time authentication of components.

FIG. 27 is a schematic block diagram illustrating a process of performing run-time authentication of components. First, the business application 2416 submits a request to cryptographic agent 2418 to operate as a trusted component. The cryptographic agent 2418 receives the request (stage 226). Next, the cryptographic agent determines the name of the application and calculates its digital "fingerprint" (stage 228). Next, the cryptographic agent 2418 transmits a request for challenge to cryptography server 2420 regarding the application (stage 230). Next, cryptography server 2120 generates a random challenge and calculates the correct response based on the operational key and the application "fingerprint" (stage 232). Next, cryptography server 2420 presents the challenge to the cryptographic agent 2418 (stage 234) and the agent performs a first part of the response calculation using the application's fingerprint by, for example combining the fingerprint with the challenge (stage 236). Next, the agent instructs the token dispenser 2414 to complete the calculation of the challenge (stage 238). Next, the token dispenser verifies the integrity of the agent, for example by comparing the stored fingerprint with the actual fingerprint of the operational agent as it is executing in memory and the token dispenser completes the response calculation, for example by computing a HMAC of the challenge and fingerprint combination using the operational key as the key in the HMAC calculation. (stage 240). Further, the cryptography server 2420 verifies the response to the challenge by verifying the HMAC with the operational key and comparing the calculated fingerprint with the stored fingerprint (stage 242) and validates the application as a trusted component.

The present invention has important benefits and advantages. Because cryptographic keys are not stored in software components, known techniques cannot be used to extract the keys and defeat the cryptographic system. Protected data items contain an associated hidden link that provides the identity of the associated cryptographic key within the key store. Further, instead of having a few keys for all of the protected information, a different key is used to protect discrete pieces of information, for example a different key is used for each protected file on a file server or for each protected record in a database. In one embodiment, the key store is located in a centralized key repository resulting in the advantage of simplified backup and disaster recovery procedures. Further, the keys themselves are encrypted in the key repository and the keys are not identifiable with their respective protected data item. Accordingly, without knowledge of the hidden link within a protected data object, even possession of the key repository does not allow an intruder to achieve access to actual data.

Additional benefits and advantages of the present invention involve the distributed nature of the cryptographic systems and methods, in that while keys are centralized in one or more key repositories, cryptographic computations are performed on remote computer systems that are closer to the actual producers and consumers of the protected data. Accordingly, the computational power of the remote computer systems is leveraged and computational efficiencies are achieved over systems in which cryptographic computations are performed centrally.

The above described computer system and database structure are utilized in the method of encrypting, storing, retrieving, and decrypting data. When a client user requests a data manipulation including add, update, and view requests, the computer system will implement the appropriate steps. For each transaction, it is assumed that the client user has already gained access to the business domain using a trusted authentication method, such as smart cards, two-factor authentication devices, or user name and password.

GLOSSARY

Asymmetric Key Cryptography: Cryptography that uses a different key to encrypt and to decrypt information. For example, in public key cryptography, a public key is used to encrypt information, but the public key cannot be used to decrypt the information. Only a private key associated with the public key can decrypt the encrypted information.

Attribute/Field: A category of data saved in an object.

Business Logic Component (BLC): A component in the computer system accessible by the client to establish and change business rules controlling operation of the system and what data will or will not be encrypted.

Certificate Manager (CM): Controls the system key PKI related operations and communicates with the private certification authority responsible for issuing and verifying digital certificates for the system keys.

Cipher Text: Encrypted data.

Class: According to object-oriented programming, a category of objects.

Database Adapter (DBAD): Software component, which allows the security domain components to save and retrieve data on various types of databases and multiple databases.

Data Encryption Standard (DES): A symmetric-key algorithm established by the U.S. government that uses a 56-bit key.

Decryption: Changing data from cipher text to plain text.

Digital Certificate: An data structure used to ensure the authenticity of a public key. A typical digital certificate includes a signed collection of certificate holder information, a public key, an identification of the certificate issuer, and the serial number of the certificate.

Encryption: The translation of data into a secret code.

Encryption Key Manager (EKM): A software component of the computer system, which manages the session encryption keys including generation, replacing, and other tasks.

Fault Tolerance: The ability of a system to continue operation in the event of unexpected hardware or software failures.

General Security Manager (GSM): A software component, which operates as a gatekeeper to the security domain and performs hashing, encryption and decryption functions.

Hardware Random Number Generator (HRNG): A device used to generate numbers randomly for the SEKID.

Hashing: Generating a number from a string of text that is substantially smaller than the text itself. In connection with a "one-way" hash function, the hash value effectively cannot be used to determine the text used to generate the hash value. The hash value or integrity value is used for search queries to identify an appropriate data object and for security integrity checks.

Internet Protocol (IP): Specifies the format of information and the addressing scheme for transmission of information over the Internet.

Internet Protocol Security (IPSEC): A set of protocols to support secure exchanges of information at the Internet protocol layer.

IP Spoofing: Attempting to make a message appear as if it came from an authorized Internet protocol address.

Key: A password or table needed to decipher encrypted data.

Key Auditing Manager (KAM): Maintains an active audit log about all EKM and SKM operations with the ability to send alarms and notifications to recipients based on policies and rules.

Key Lifetime Manager (KLM): Monitors the SEK's for expiration and deactivates expired SEK's or alternatively flags SEK's to be deactivated in the next request or call.

Memory (RAM): Random access memory.

Message Digest 5 (MD5): A one-way hash function, which takes a message and converts it to a hash value, or message digest, of a particular size. It is called a one-way hash function because it is nearly impossible to reverse the process, converting the hash value to the original message.

Object: A self-contained entity consisting of both data and procedures, or methods, to manipulate the data.

Object Oriented Refers to a special type of programming that combines data structures with functions or methods to create reusable and extensible program elements called objects.

Plain Text: Unencrypted data.

Public Key Infrastructure (PKI): A collection of hardware and software systems to facilitate reliable use of public key cryptography, including certification authorities to certify digital certificates, and other registration authorities that verify and authenticate the validity and identity of parties involved with signing or receiving encrypted messages using public key cryptography.

Secure Hash Algorithm (SHA-1): Another one-way hash function.

Secure Key Database (KEYDB): A database inside the security domain on which the SEK's and SEKID's are saved.

Secure Sockets Layer (SSL): A protocol developed for transmitting information securely over the public Internet.

Session Encryption Key (SEK): A key used to encrypt and decrypt data over the course of a session, which is a period during which data is being accessed.

Session Encryption Key Identifier (SEKID): A randomly generated identification number for the SEK.

Smart Card: A small electronic device about the size of a credit card that contains electronic memory. It may include an integrated circuit.

Symmetric Key Encryption: An encryption system in which data is both encrypted and decrypted using the same key.

System Key Pair: An asymmetric key pair that is used to encrypt and decrypt the SEKID's.

System Key Common Name (SKCN): System key digital certificate serial number and subject common name.

System Key Manager (SKM): Manages system keys including generation, verification, and other tasks.

Virtual Private Network (VPN): A virtual connection over a public network for conducting private exchange of information using cryptographic techniques.

X.509: A widely used standard for defining digital certificates.

The invention claimed is:

1. A method of encrypting and storing a data entity, the method comprising the steps of:
   transmitting a public component of a fifth encryption key from a first computer system to a second computer system;
   using the public component of the fifth encryption key to encrypt a first encryption key, resulting in an encrypted first encryption key;
   transmitting the encrypted first encryption key from the second computer system to the first computer system;
   decrypting the encrypted first encryption key using a private component of the fifth encryption key;
   encrypting the data entity using the first encryption key having a first encryption key identification;
   encrypting the first encryption key identification using a second encryption key having a second encryption key identification;
   encrypting the second encryption key identification using a third encryption key;
   storing the encrypted data entity, the encrypted first encryption key identification, and the encrypted second encryption key identification together on the first computer system;
   encrypting the first encryption key using a fourth encryption key having a fourth encryption key identification;
   encrypting the fourth encryption key identification using the third encryption key;
   encrypting the second and fourth encryption keys using the third encryption key;
   storing the unencrypted first encryption key identification, the encrypted fourth encryption key identification, and the encrypted first encryption key together on the second computer system;
   storing the unencrypted second encryption key identification and the encrypted second encryption key together on the second computer system;
   storing the unencrypted fourth encryption key identification and the encrypted fourth encryption key together on the second computer system; and
   securing the third encryption key.

2. The method of claim 1 further comprising the step of encrypting the fourth encryption key identification using the third encryption key.

3. The method of claim 1 wherein access to operations involving an encryption key is provided based on an authorization module including an access control list.

4. A method of decrypting a data entity, the method comprising the steps of:
   at a second computer system;
   receiving identity information and a copy of a hidden link from a requester desiring to decrypt the data entity, wherein the data entity is stored on a first computer system in association with the hidden link and is encrypted by a first encryption key,
   confirming based on the identity information and the copy of the hidden link that the requester has authority to decrypt the data entity,
   accessing a third encryption key and using the third encryption key to decrypt a second encryption key identification and a fourth encryption key identification,
   identifying a second encryption key using the decrypted second encryption key identification,
   using the second encryption key to decrypt a first encryption key identification,
   identifying the first encryption key using the decrypted first encryption key identification,
   identifying a fourth encryption key using the decrypted fourth encryption key identification,
   using the fourth encryption key to decrypt the first encryption key,
   receiving a public component of a fifth encryption key,
   using the public component of the fifth encryption key to encrypt the first encryption key, resulting in an encrypted first key,
   transmitting the encrypted first encryption key from the second computer system to the first computer system; and
   at the first computer system;
   decrypting the encrypted first encryption key using a private component of the fifth encryption key, and
   decrypting the data entity using the first encryption key.

5. The method of claim 4 further comprising the step of decrypting the encrypted fourth encryption key using the third encryption key.

6. The method of claim 4 further comprising the step of decrypting the encrypted second encryption key using the third encryption key.

7. The method of claim 4 wherein access to operations involving an encryption key is provided based on an authorization module including an access control list.

8. The method of claim 4 wherein the hidden link comprises the encrypted first encryption key identification and the encrypted second encryption key identification.

* * * * *